(12) United States Patent
Rai

(10) Patent No.: US 12,531,130 B2
(45) Date of Patent: Jan. 20, 2026

(54) NON-VOLATILE STORAGE DEVICE OFFLOADING

(71) Applicant: Kioxia Corporation, Tokyo (JP)

(72) Inventor: Devesh Kumar Rai, San Ramon, CA (US)

(73) Assignee: KIOXIA CORPORATION, Tokyo (JP)

( * ) Notice: Subject to any disclaimer, the term of this patent is extended or adjusted under 35 U.S.C. 154(b) by 20 days.

(21) Appl. No.: 18/758,495

(22) Filed: Jun. 28, 2024

(65) Prior Publication Data

US 2025/0356938 A1 Nov. 20, 2025

Related U.S. Application Data

(60) Provisional application No. 63/649,124, filed on May 17, 2024.

(51) Int. Cl.
*G11C 29/42* (2006.01)
*G06F 11/10* (2006.01)
*H03M 13/29* (2006.01)

(52) U.S. Cl.
CPC ......... *G11C 29/42* (2013.01); *H03M 13/2942* (2013.01); *G06F 11/1068* (2013.01)

(58) Field of Classification Search
None
See application file for complete search history.

(56) References Cited

U.S. PATENT DOCUMENTS

| | | | |
|---|---|---|---|
| 10,664,193 B2 * | 5/2020 | Shinozuka | G06F 3/0688 |
| 11,971,782 B2 * | 4/2024 | Trika | G06F 11/108 |
| 12,112,055 B2 * | 10/2024 | Wysocki | G06F 3/0688 |
| 2018/0101441 A1 * | 4/2018 | Hyun | G06F 3/0665 |
| 2018/0129451 A1 * | 5/2018 | Park | G06F 11/108 |
| 2021/0081276 A1 * | 3/2021 | Suzuki | G06F 3/0619 |
| 2021/0096945 A1 | 4/2021 | Kotzur et al. | |
| 2021/0096951 A1 | 4/2021 | Kotzur et al. | |
| 2023/0325278 A1 * | 10/2023 | Desai | G06F 11/0772 714/6.22 |

OTHER PUBLICATIONS

R. E. Galbraith, L. D. Cleveland, J. Yu, D. Moertl and M. Zhang, "Highly automated hardware and firmware RAID SoC design optimized for memory class storage devices," 2013 International SoC Design Conference (ISOCC), Busan, Korea (South), 2013, pp. 282-285, (Year: 2013).*

* cited by examiner

*Primary Examiner* — Daniel F. McMahon
(74) *Attorney, Agent, or Firm* — Foley & Lardner LLP

(57) ABSTRACT

Various examples, controllers and methods are disclosed relating to parity checking. One controller can perform a plurality of read operations to read first data from the local non-volatile memory and at least one second storage device. The controller further can determine at least one first intermediate parity based on performing at least one first XOR operation of the first data, the at least one first intermediate parity. The controller further can retrieve at least one second intermediate parity of second data from at least one remote buffer of at least one third storage device. The controller further can determine at least one partial parity based on performing at least one second XOR operation of the at least one first intermediate parity and the at least one second intermediate parity. The controller further can store the at least one partial parity in at least one fourth storage device.

20 Claims, 9 Drawing Sheets

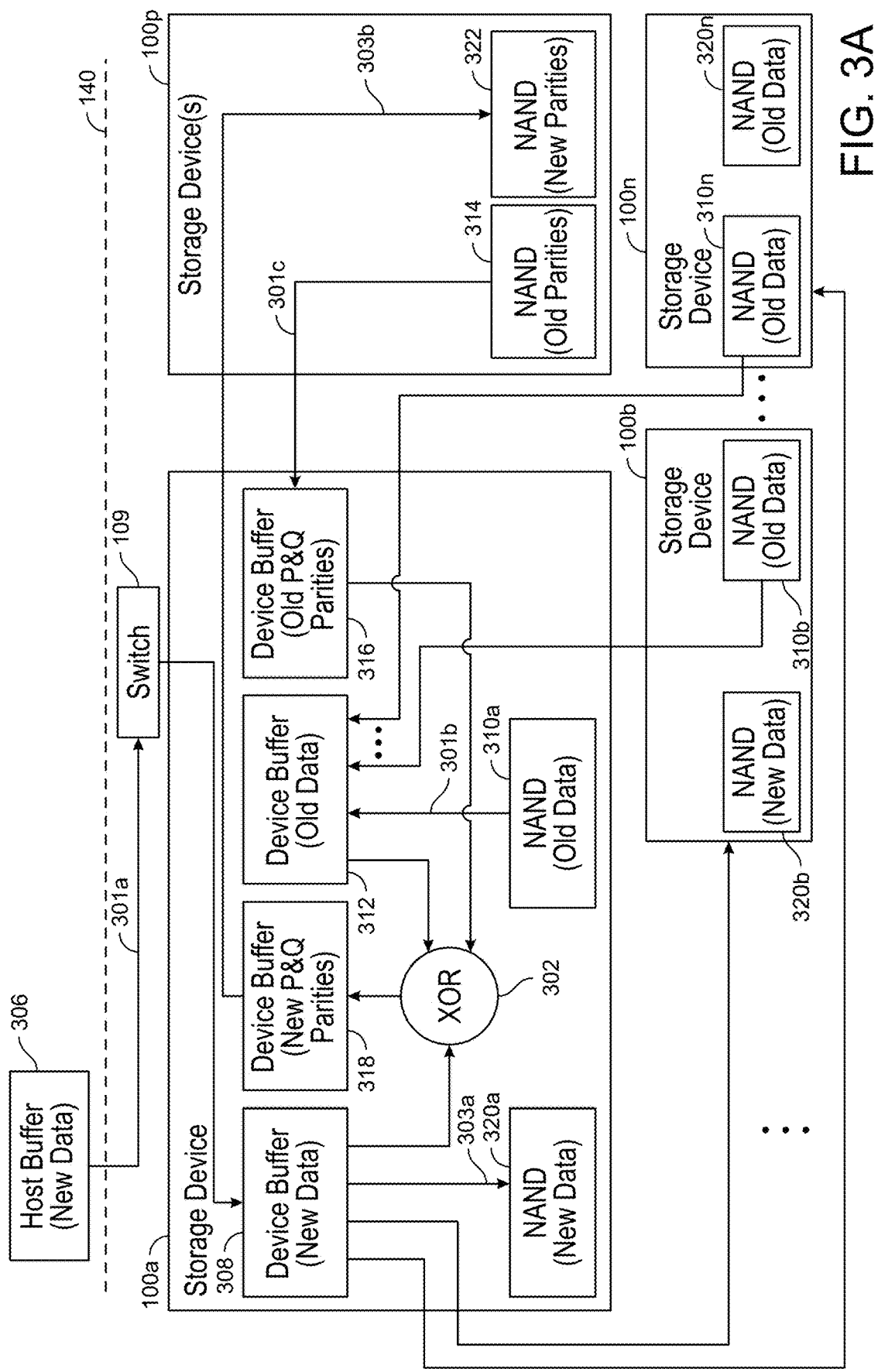

NON-VOLATILE STORAGE DEVICE OFFLOADING

CROSS-REFERENCE TO RELATED APPLICATIONS AND CLAIM OF PRIORITY

This application claims the benefit of, and priority to U.S. Provisional Application No. 63/649,124, filed May 17, 2024, which is incorporated by reference herein in its entirety and for all purposes.

TECHNICAL FIELD

The present disclosure generally relates to systems, methods, and non-transitory processor-readable media for data processing using multiple non-volatile memory devices.

BACKGROUND

A general system that provides data storage can include a compute node or host coupled to multiple non-volatile memory devices via one or more interfaces. The compute node can include a processing unit such as a Central Processing Unit (CPU) coupled to a memory unit such as a Dynamic Random Access Memory (DRAM). The CPU can be coupled to the one or more interfaces via a root complex. Redundant Array of Independent Disks (RAID) can be implemented on the non-volatile memory devices to achieve protection from drive failures.

BRIEF SUMMARY

Some implementations relate to a first storage device, including a local non-volatile memory and a controller configured to perform a plurality of read operations to read first data from the local non-volatile memory and at least one second storage device. The controller configured to determine at least one first intermediate parity based on performing at least one first XOR operation of the first data, the at least one first intermediate parity being stored in at least one local buffer of the first storage device. The controller configured to retrieve at least one second intermediate parity of second data from at least one remote buffer of at least one third storage device, the at least one second intermediate parity being stored in the at least one remote buffer of at least one third storage device after being determined by the at least one third storage device. The controller configured to determine at least one partial parity based on performing at least one second XOR operation of the at least one first intermediate parity and the at least one second intermediate parity. The controller configured to store the at least one partial parity in at least one fourth storage device, the at least one partial parity corresponds to a set of data, and the set of data includes the first data and the second data.

In some implementations, the at least one second intermediate parity is retrieved from the at least one remote buffer of the at least one third storage device exposed to the first storage device for retrieval.

In some implementations, the first storage device is one of a plurality of storage devices of a first data node of a plurality of data nodes of a redundant array of independent disk (RAID) volume, and the first storage device is one of a set of storage devices of the plurality of data nodes, the set of storage devices corresponding with a plurality of data segments organized into a data stripe of the RAID volume, the data stripe includes a set of data blocks including the set of data distributed across the set of storage devices, and each of the set of storage devices is a solid-state drive (SSD) in communication with a compute node via an interface.

In some implementations, the at least one first intermediate parity includes an intermediate partial P parity bit and an intermediate partial Q parity bit of the plurality of storage devices of the first data node and the at least one of partial parity includes a partial P parity bit and a partial Q parity bit of the plurality of data nodes.

In some implementations, the at least one first intermediate parity includes an intermediate partial PQ parity bit of the plurality of storage devices of the first data node and the at least one of partial parity includes a partial PQ parity bit of the plurality of data nodes.

In some implementations, the at least one third storage device corresponds to a second data node of the plurality of data nodes and the first storage device and the at least one third storage device operatively coupled via the interface.

In some implementations, the controller is further configured to in response to performing the plurality of read operations, perform a write operation to write the stored data to one or more controller memory buffers (CMBs) of the controller and in response to determining the at least one first intermediate parity, store the at least one first intermediate parity in the one or more CMBs of the controller.

In some implementations, the at least one local buffer is the one or more CMBs of the controller, the at least one at least one remote buffer is one or more remote CMBs of a remote controller of the at least one third storage device.

In some implementations, the controller include the one or more CMBs, the local non-volatile memory corresponding with the controller includes a NAND memory device, and the first storage device corresponding with a portion of a data segment.

In some implementations, storing the at least one partial parity in the at least one fourth storage device includes performing a write operation to write the at least one partial parity to at least one remote non-volatile storage of the at least one fourth storage device.

Some implementations relate to a method, including performing a plurality of read operations to read first data from a local non-volatile memory and at least one second storage device. The method including determining at least one first intermediate parity based on performing at least one first XOR operation of the first data, the at least one first intermediate parity being stored in at least one local buffer of the first storage device. The method including retrieving at least one second intermediate parity of second data from at least one remote buffer of at least one third storage device, the at least one second intermediate parity being stored in the at least one remote buffer of at least one third storage device after being determined by the at least one third storage device. The method including determining at least one partial parity based on performing at least one second XOR operation of the at least one first intermediate parity and the at least one second intermediate parity. The method including storing the at least one partial parity in at least one fourth storage device, the at least one partial parity corresponds to a set of data, and the set of data includes the first data and the second data.

In some implementations, the at least one second intermediate parity is retrieved from the at least one remote buffer of the at least one third storage device exposed to the first storage device for retrieval.

In some implementations, the first storage device is one of a plurality of storage devices of a first data node of a plurality of data nodes of a redundant array of independent disk (RAID) volume, the first storage device is one of a set of storage devices of the plurality of data nodes, the set of storage devices corresponding with a plurality of data segments organized into a data stripe of the RAID volume, the data stripe includes a set of data blocks including the set of data distributed across the set of storage devices, and each of the set of storage devices is a solid-state drive (SSD) in communication with a compute node via an interface.

In some implementations, the at least one first intermediate parity includes an intermediate partial P parity bit and an intermediate partial Q parity bit of the plurality of storage devices of the first data node and the at least one of partial parity includes a partial P parity bit and a partial Q parity bit of the plurality of data nodes.

In some implementations, the at least one first intermediate parity includes an intermediate partial PQ parity bit of the plurality of storage devices of the first data node and the at least one of partial parity includes a partial PQ parity bit of the plurality of data nodes.

In some implementations, the at least one third storage device corresponds to a second data node of the plurality of data nodes and the first storage device and the at least one third storage device operatively coupled via the interface.

In some implementations, the method further including in response to performing the plurality of read operations, performing a write operation to write the stored data to one or more controller memory buffers (CMBs) and in response to determining the at least one first intermediate parity, storing the at least one first intermediate parity in the one or more CMBs.

In some implementations, the at least one local buffer is the one or more CMBs, the at least one at least one remote buffer is one or more remote CMBs of a remote controller of the at least one third storage device.

In some implementations, storing the at least one partial parity in the at least one fourth storage device includes performing a write operation to write the at least one partial parity to at least one remote non-volatile storage of the at least one fourth storage device.

Some implementations relate to at least one non-transitory processor-readable medium including processor-readable instructions, such that, when executed by a processor of a first storage device, causes the processor to perform a plurality of read operations to read first data from a local non-volatile memory and at least one second storage device, determine at least one first intermediate parity based on performing at least one first XOR operation of the first data, the at least one first intermediate parity being stored in at least one local buffer of the first storage device, retrieve at least one second intermediate parity of second data from at least one remote buffer of at least one third storage device, the at least one second intermediate parity being stored in the at least one remote buffer of at least one third storage device after being determined by the at least one third storage device, determine at least one partial parity based on performing at least one second XOR operation of the at least one first intermediate parity and the at least one second intermediate parity, and store the at least one partial parity in at least one fourth storage device, the at least one partial parity corresponds to a set of data, and the set of data includes the first data and the second data.

Some implementations relate to a first storage device, including a local non-volatile memory and a controller configured to perform a plurality of read operations to read stored data from the local non-volatile memory and at least one second storage device. The controller is configured to determine at least one intermediate parity based on performing at least one XOR operation of the stored data, the at least one intermediate parity being stored in at least one local buffer of the first storage device. The controller is configured to store at least one intermediate parity to at least one local buffer. The controller is configured to expose the at least one intermediate parity of the at least one local buffer to at least third storage device or a compute node, wherein the at least one intermediate parity correspond to one of a plurality of intermediate parities used to determine at least one partial parity of a redundant array of independent disk (RAID) volume.

In some implementations, the first storage device is one of a plurality of storage devices of a first data node of a plurality of data nodes of the RAID volume, the first storage device is one subset of a set of storage devices of the plurality of data nodes, the set of storage devices corresponding with a plurality of data segments organized into a data stripe of the RAID volume, the data stripe includes a set of data blocks including the set of data distributed across the set of storage devices, and each of the set of storage devices is a solid-state drive (SSD) in communication with the compute node via an interface.

In some implementations, the at least one intermediate parity includes an intermediate partial P parity bit and an intermediate partial Q parity bit of the plurality of storage devices of the first data node.

In some implementations, the at least one intermediate parity includes an intermediate partial PQ parity bit of the plurality of storage devices of the first data node.

In some implementations, the at least one third storage device corresponds to a second data node and the first storage device and the at least one third storage device operatively coupled via the interface.

In some implementations, the controller is further configured to in response to performing the plurality of read operations, perform a write operation to write the stored data to one or more controller memory buffers (CMBs) of the controller and in response to determining the at least one intermediate parity, store the at least one intermediate parity to the one or more CMBs of the controller.

Some implementations relate to a method including performing a plurality of read operations to read stored data from the local non-volatile memory and at least one second storage device. The method including determining at least one intermediate parity based on performing at least one XOR operation of the stored data, the at least one intermediate parity being stored in at least one local buffer of the first storage device. The method including storing at least one intermediate parity to at least one local buffer. The method including exposing the at least one intermediate parity of the at least one local buffer to at least third storage device or a compute node, wherein the at least one intermediate parity correspond to one of a plurality of intermediate parities used to determine at least one partial parity of a redundant array of independent disk (RAID) volume.

Some implementations relate to a first storage device, including a local non-volatile memory and a controller configured to perform a plurality of read operations to read stored data from a set of storage devices of a redundant array of independent disk (RAID) volume. The controller configured to determine at least one partial parity by performing at least one XOR operation of new data and the stored data, the new data is received from a compute node, the stored data is stored as first data in at least one local buffer of the first storage device and as second data in at least one second storage device, and the stored data includes at least existing data and parity information. The controller configured to store the at least one partial parity in at least one third storage device, the at least one partial parity corresponds to a set of data, and the set of data includes the first data and the second data. The controller configured to perform a write operation to write the new data to the local non-volatile memory.

In some implementations, performing the plurality of read operations is in response to receiving a request from the compute node operatively coupled to the first storage device.

In some implementations, in response to receiving the request, the controller transfers, across an interface, the new data from the compute node to a first local buffer of the controller and performs a first read operation of the plurality of read operations to read the stored data from the at least one local non-volatile memory to a second local buffer of the controller.

In some implementations, in response to receiving the request, the controller performs, across the interface, a second read operation of the plurality of read operations to read the stored data from the at least one remote non-volatile storage of the at least one second storage device to a third local buffer of the controller.

In some implementations, the first storage device is one of a plurality of storage devices of a first data node of a plurality of data nodes of the RAID volume, the first storage device is one of the set of storage devices of the plurality of data nodes, the set of storage devices corresponding with a plurality of data segments organized into the data stripe of the RAID volume, the data stripe includes a set of data blocks including the set of data distributed across the set of storage devices, and each of the set of storage devices is a solid-state drive (SSD) in communication with the compute node via the interface.

In some implementations, the at least one local buffer is at least one first controller memory buffer (CMB) of the controller and the second storage device include at least one second CMB of a second controller.

In some implementations, the parity information includes a partial P parity bit and a partial Q parity bit.

Some implementations relate to a method including performing a plurality of read operations to read stored data from a set of storage devices of a redundant array of independent disk (RAID) volume. The method including determining at least one partial parity by performing at least one XOR operation of new data and the stored data, the new data is received from a compute node, the stored data is stored as first data in at least one local buffer of the first storage device and as second data in at least one second storage device, and the stored data includes at least existing data and parity information. The method including storing the at least one partial parity in at least one third storage device, the at least one partial parity corresponds to a set of data, and the set of data includes the first data and the second data. The method including performing a write operation to write the new data to the local non-volatile memory.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers indicate identical, functionally similar, and/or structurally similar elements.

FIG. 3A is a block diagram illustrating an example method for performing one or more parity checks, according to some implementations.

It will be recognized that some or all of the figures are schematic representations for purposes of illustration. The figures are provided for the purpose of illustrating one or more implementations with the explicit understanding that they will not be used to limit the scope of the meaning the claims.

DETAILED DESCRIPTION

This disclosure relates to systems and methods for offloading disk scrubbing operations including parity checking. Often, during disk scrubbing data is transferred to and from SSDs in a RAID group or array. That is, during disk scrubbing operations in RAID systems, such as RAID 5 or RAID 6, the disk scrubbing process often includes performing parity checks. Typically, as the RAID system reads all data and associated parity from the disks, a host or compute node can recalculate the parity for the data blocks being read and compare it against the stored parity. This step constitutes a parity check. However, performing parity checks by hosts or compute nodes can be resource-intensive and slow down system performance. That is, handling large volumes of data and parity calculations demand significant processing power and bandwidth, which can impact the overall system efficiency and throughput. Accordingly, the systems and methods described in the various implementations herein provide improvements by reducing the computational load on primary processors and enhancing data throughput. The parity checking described herein decreases and/or eliminates the CPU usage for segment passes and DRAM bandwidth, while varying the load on PCIe and network segments to improve system resources. That is, the systems and methods provide granular implementations to disk scrubbing, maintaining data integrity by addressing discrepancies in both data and parity segments during RAID operations.

Figure 1:
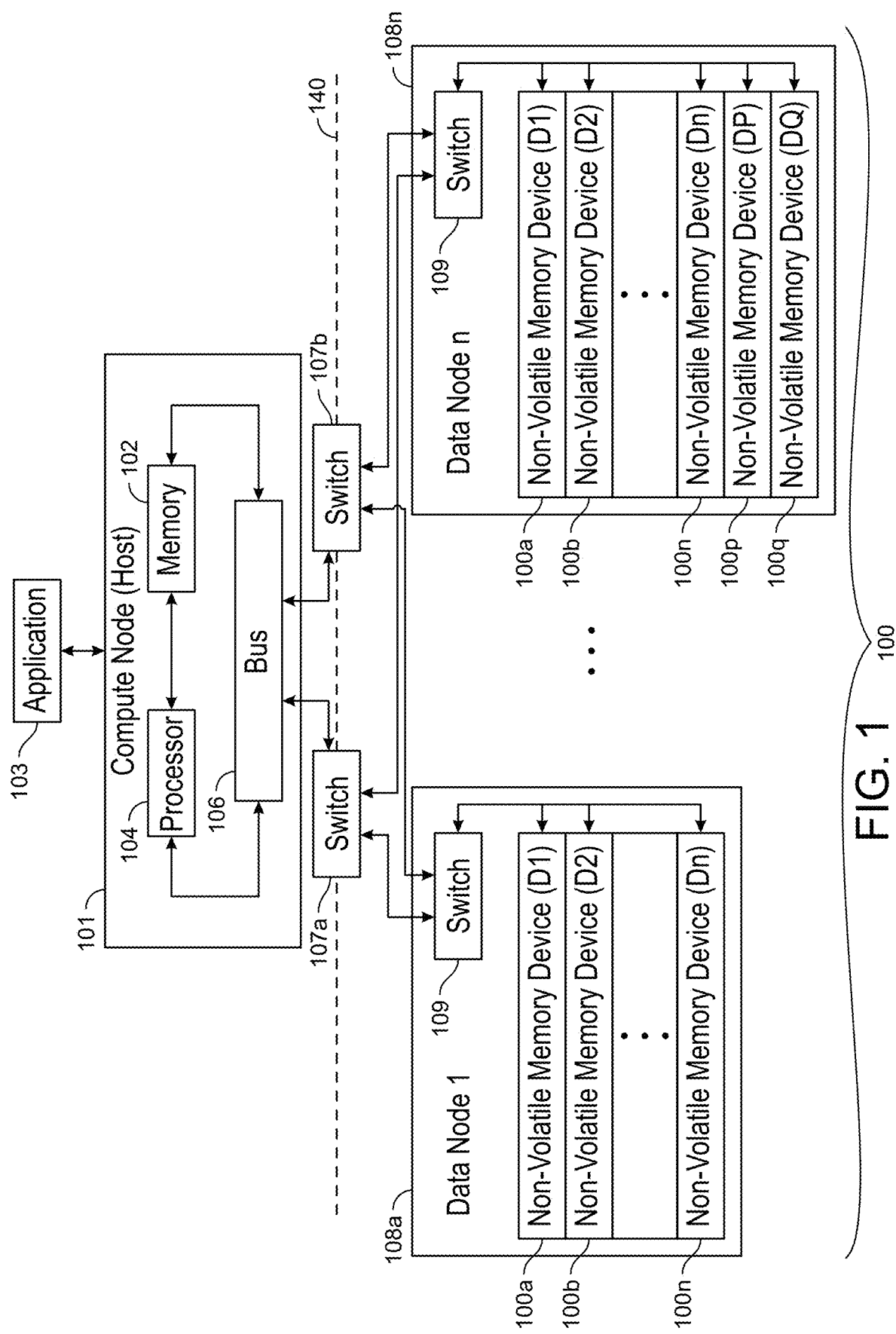
FIG. 1 is a block diagram illustrating an example system including data nodes and a compute node, according to some implementations.

Referring now to FIG. 1, a block diagram illustrating an example system including data nodes and a compute node, according to some implementations. To assist in illustrating the present implementations, FIG. 1 shows a block diagram of a system including non-volatile memory devices 100a, . . . , 100n (collectively, "non-volatile memory devices 100") coupled to a compute node 101 (or host 101) according to some examples. The compute node 101 can be a user device operated by a user or an autonomous central controller of the non-volatile memory devices 100, where the compute node 101 and non-volatile memory devices 100 correspond to a storage subsystem or storage appliance. The compute node 101 can be connected to an application 103 (e.g., via a network interface) such that applications or other compute node (host) computers (not shown) may access the storage subsystem or storage appliance via a communication network. Examples of such a storage subsystem or appliance include an All Flash Array (AFA) or a Network Attached Storage (NAS) device. As shown, the compute node 101 includes a memory 102, a processor 104, and a bus 106. The processor 104 is operatively coupled to both the memory 102 and the bus 106. In some implementations, the processor 104 and the memory 102 are operatively coupled to the bus 106 through a root complex (e.g., PCIe root complex). The processor 104 is sometimes referred to as a Central Processing Unit (CPU) of the compute node 101, and configured to perform processes of the compute node 101.

The memory 102 is a local memory of the compute node 101. In some examples, the memory 102 is or a buffer, sometimes referred to as a host buffer. In some examples, the memory 102 is a volatile storage. In other examples, the memory 102 is a non-volatile persistent storage. Examples of the memory 102 include but are not limited to, Random Access Memory (RAM), Dynamic Random Access Memory (DRAM), Static RAM (SRAM), Magnetic RAM (MRAM), Phase Change Memory (PCM), and so on. In some implementations, the compute node 101 can be communicably coupled to an external host that includes application 103. This host may be distinct from the compute node 101 and serves as an interface for managing and processing data requests from application 103. By this implementation, the external host can access the storage subsystem or appliance managed by the compute node 101, facilitating data interactions for application 103 operations.

The bus 106 includes one or more of software, firmware, and hardware that provide an interface through components of the compute node 101 can communicate. Examples of components include but are not limited to, the processor 104, network cards, storage devices, the memory 102, graphic cards, and so on. In addition, the compute node 101 (e.g., the processor 104) can communicate with the non-volatile memory devices 100 of data nodes 108a, . . . , 108n using the bus 106. In some examples, the non-volatile memory devices 100 are attached or communicably coupled to the bus 106 over a suitable interface 140.

In some implementations, the suitable interface 140 may be switches 107a and 107b (collectively referred to herein as "switches 107"). For example, switch 107a and/or switch 107b may be a PCIe switch, an Ethernet switch, or an InfiniBand switch, depending on the communication protocols and bandwidth requirements of the compute node 101 and non-volatile memory devices 100. A PCIe switch can be used to provide direct attachments of the RAID-configured storage devices with the compute node 101. An Ethernet switch may be used to provide network-based connectivity for RAID volumes. An InfiniBand switch may be used to support high-performance data exchanges for RAID configurations. The bus 106 can be one or more of a serial, a PCIe bus or network, a PCIe root complex, an internal PCIe switch, and so on. In some implementations, the switch 107a and/or switch 107b can be integrated into bus 106 such that the suitable interface 140 can support various protocols such as PCIe, Ethernet, and InfiniBand, providing various connectivity options for different storage and processing requirement.

One or more of the non-volatile memory devices 100 can form a RAID array (or group) for parity protection. The RAID group can be distributed across various data nodes 108a-n (collectively referred to herein as "data nodes 108"). That is, one or more of the non-volatile memory devices 100 store parity data (e.g., parity bits) for data stored on those devices and/or data stored on other ones of the non-volatile memory devices 100. As shown, the data nodes 108 can include a plurality of non-volatile memory devices 100a-n. Additionally, the data nodes 108 can include a switch 109 configured to facilitate data routing to non-volatile memory devices 100 of the data node.

Data nodes 108 can contain non-volatile memory devices 100a-n configured for data storage and retrieval. In some implementations, one or more of the non-volatile memory devices 100 can perform operations on data segments of RAID configurations. For instance, the one or more of the non-volatile memory devices 100 can calculate parity bits (e.g., P parity bit, Q parity bit) for RAID configurations using XOR operations and Galois Field arithmetic. In some implementations, a subset of the non-volatile memory devices 100 can store and manage P and Q parity bits.

One or more of the non-volatile memory devices 100 within each data node can calculate intermediate partial P and Q parity bits. The RAID array can be distributed across various data nodes 108a-n, each configured to perform parity calculations. That is, one or more of the non-volatile memory devices 100 perform XOR operations using local data segments and Galois Field arithmetic to produce intermediate partial parity bits. As shown, a storage device of each data node 108 can contribute to the overall parity calculation by processing these intermediate results, which can be exposed to a storage device to perform final XOR operations. In some implementations, one or more storage devices within a node of the RAID volume can perform final XOR operations on the intermediate parity bits to determine the final partial P and Q parity bits. For instance, storage device 100a of data node 108a may perform XOR operations on a portion of data of a stripe stored in storage devices 100a-n of data node 108a. In this instance, the storage device 100a may also retrieve intermediate partial parity bit computations (e.g., of the other portions of data of the stripe) from exposed buffers (e.g., CMBs) of storage device 100b of data node 108b and storage device 100c of data node 108c. The exposed buffers can include the intermediate partial parity bit from the XOR operation of the respective data node.

In some implementations, retrieving can include interfacing with the storage devices using switch 109 and/or switches 107a-b. In some implementations, at least one of the data nodes 108a-n can include a parity device (or parity storage device) that stores parity information. For instance, non-volatile memory device (DP) 100p may manage, store, and update partial P parity bits and non-volatile memory device (DQ) 100q may manage, store, and update partial P parity bits. That is, at least one of the XOR operations performed by the storage nodes can include XORing the partial P parity bit and/or partial Q parity bit (e.g., stored in flash memory of the non-volatile memory device). For instance, at least one of the non-volatile memory devices 100 can retrieve intermediate parity bits from multiple data nodes 108*a-n*, perform XOR operations on the intermediate parity bits to determine partial parities, and store them in dedicated parity devices.

In some implementations, the non-volatile memory devices 100 within a platform are connected to a Top of Rack (TOR) switch (e.g., switch 109) and can communicate with each other via the TOR switch or another suitable intra-platform communication mechanism. Switch 109 may be a PCIe switch, an Ethernet switch, an InfiniBand switch, or any suitable networking switch. In some implementations, at least one router may facilitate communications among the storage devices in different platforms, racks, or cabinets via a suitable networking fabric (e.g., fiber channel, Multiprotocol Label Switching (MPLS), or any scalable network architecture). That is, the data nodes 108 can be different platforms, racks, or cabinets where switches 109 that can communicate across nodes using PCIe, Ethernet, InfiniBand, or any suitable. For instance, the communication between the data nodes 108 using switches 109 can be using interface 140 (e.g., switches 107*a-b*). In some implementations, communications from non-volatile memory device 100*a* of data node 108*a* can be routed to non-volatile memory device 100*b* of data node 108*n* using switches 109 of each data node 108*a-b* and using interface 140. Examples of the non-volatile memory devices 100 (also referred to herein as "storage devices") include non-volatile devices such as but are not limited to, an SSD, a Non-Volatile Dual In-line Memory Module (NVDIMM), a Universal Flash Storage (UFS), a Secure Digital (SD) device, and so on.

Switch 109, in some implementations configured as a Top of Rack (TOR) switch within data nodes 108, manages data and parity traffic between storage devices. This switch supports protocols for data integrity and RAID process alignment. That is, switch 109 can routes communications across storage devices internal or external to a specific rack or cabinet using a suitable networking fabric. For instance, the RAID array (or group) can include one or more dedicated non-volatile memory devices 100. For example, non-volatile memory device (DP) 100*p* can store the P parity bit (partial), for example in a memory array. That is, the non-volatile memory device (DP) 100*p* can facilitate updates, expose parity information to other non-volatile memory devices 100, and perform recalculations. In another example, non-volatile memory device (DQ) 100*q* can store the Q parity bit (partial), for example in a memory array. That is, the non-volatile memory device (DQ) 100*q* can facilitate updates, expose parity information to other non-volatile memory devices 100, and perform recalculations. While non-volatile memory devices (e.g., the NAND flash memory devices 130*a*-130*n*) are presented as examples herein, the disclosed schemes can be implemented on any storage system or device that is connected to the compute node 101 over an interface, where such system temporarily or permanently stores data for the compute node 101 for later retrieval. The dedicated non-volatile memory devices for managing and storing the P and Q parity bits can be referred to herein as "parity drives."

In some implementations, the P parity bit (partial) can be used in the RAID array or group shown to provide single parity, which can facilitate the recovery from the failure of a single drive (e.g., non-volatile memory device 100*a-n*). The P parity bit can be calculated by performing an XOR (exclusive OR) operation across corresponding bits of data across multiple drives (e.g., non-volatile memory devices 100*a-n*) by one or more of the non-volatile memory devices 100. This parity information can then be stored on a separate, dedicated non-volatile memory device within the RAID array, for example in non-volatile memory device (DP) 100*p* (e.g., P parity drive). Thus, the P parity bit can facilitate the reconstruction of missing data when one drive fails. In some implementations, non-volatile memory device (DP) 100*p* can store parity bits calculated from the XOR operation across the data bits of the other non-volatile memory devices 100. Additionally, when compute node 101 performs a write operation to the non-volatile memory devices 100 in the RAID array, the P parity can be recalculated to reflect the new data. The recalculation can also be performed using an XOR operation. In some implementations, the XOR operation can be performed by one or more of the non-volatile memory devices 100.

In some implementations, the Q parity bit (partial) can be used in the RAID array or group shown to provide double parity, which can facilitate the recovery from the failure of two drives (e.g., non-volatile memory device 100*a-n*). The Q parity bit can be calculated by performing an XOR (exclusive OR) operation using a Galois coefficient across corresponding bits of data across multiple drives (e.g., non-volatile memory device 100*a-n*) by one or more of the non-volatile memory devices 100. That is, the Galois coefficient may be determined using Galois Field (GF) arithmetic, which provides a second layer of redundancy. For instance, the Galois coefficient can be a power of two, used in the polynomial representation of Galois Field (GF) arithmetic. This parity information can then be stored on a separate, dedicated non-volatile memory device within the RAID array, for example in non-volatile memory device (DQ) 100*q* (e.g., q parity drive). Thus, the Q parity bit can facilitate the reconstruction of missing data when two drives fail. In some implementations, non-volatile memory device (DQ) 100*q* can store parity bits calculated from the XOR operation using a Galois coefficient across the data bits of the other non-volatile memory devices 100. Additionally, when compute node 101 performs a write operation to the non-volatile memory devices 100 in the RAID array, the Q parity can be recalculated to reflect the new data. The recalculation can also be performed using an XOR operation and a Galois coefficient. In some implementations, the XOR operation can be performed by one or more of the non-volatile memory devices 100.

In a read operation by non-volatile memory devices 100 within a RAID array, non-volatile memory device 100*a* of data node 108*a* can access data exposed by non-volatile memory device 100*b* of data node 108*n*. The process can be facilitated by interactions and communications through switches 109 and 107*a-b*. For instance, when a read request is issued from non-volatile memory device 100*a* to access data from non-volatile memory device 100*b*, the request first is transmitted to the local switch 109 within data node 108*a*. This switch 109, which may be configured as a PCIe, Ethernet, or InfiniBand switch (e.g., based on the data throughput and latency requirements), can route the request to the corresponding switch in data node 108*n* via the network infrastructure. As the request reaches data node 108*n*, switch 109 can direct the read operation to the target non-volatile memory device 100*b*. In some implementations, the routing between switches 109 in data nodes 108*a* and 108*n* can utilize interface 140. The switches 107*a-b* of interface 140 can manage the intra-node communication. The switches 107*a-b* can facilitate the transmission of data and can prioritize traffic as necessary to maintain data integrity and minimize latency between the non-volatile memory devices 100 and between a non-volatile memory device and compute node 101.

The processor 104 can execute an Operating System (OS), which provides a filesystem and applications which use the filesystem. The processor 104 can communicate with the non-volatile memory devices 100 (e.g., a controller 110 of each of the non-volatile memory devices 100) via a communication link or network (e.g., switches 107a-b and/or switch 109). In that regard, the processor 104 can send data to and receive data from one or more of the non-volatile memory devices 100 using the interface 140 (e.g., switches 107a-b) and switch 109 of the data node 108 to the application 103 via communication link or network. The interface 140 allows the software (e.g., the filesystem) running on the processor 104 to communicate with the non-volatile memory devices 100 (e.g., the controllers 110 thereof) via the bus 106. The non-volatile memory devices 100 (e.g., the controllers 110 thereof) are operatively coupled to the bus 106 directly via the interface 140. While the interface 140 is conceptually shown as a dashed line between the compute node 101 and the non-volatile memory devices 100, the interface 140 can include one or more controllers, one or more physical connectors, one or more data transfer protocols including namespaces, ports, transport mechanism, and connectivity thereof. For example, interface 140 can be the switches 107a and 107b as shown. While the connection between the compute node 101 and the non-volatile memory devices 100a, . . . , n, is shown as link through various switches (e.g., switches 107a-b and switch 109), in some implementations the link may be direct or include a network fabric which may include networking components such as bridges and/or additional switches.

To send and receive data, the processor 104 (the software or filesystem run thereon) communicates with the non-volatile memory devices 100 using a storage data transfer protocol running on the switches 107a and 107b. Examples of the protocol include but is not limited to, the SAS, Serial ATA (SATA), and NVMe protocols. In some examples, the switches 107a and 107b include hardware (e.g., controllers) implemented on or operatively coupled to the bus 106, the non-volatile memory devices 100 (e.g., the controllers 110), or another device operatively coupled to the bus 106 and/or the non-volatile memory device 100 via one or more suitable networks. The switches 107a and 107b and the routing protocol running thereon can include software and/or firmware executed on such hardware. Additionally, switch 109 and the routing protocol running thereon can include software and/or firmware executed on such hardware.

In some examples the processor 104 can communicate, via the bus 106. Applications 103 and other compute node (host) systems (not shown) attached or communicably coupled to a communication network can communicate with the compute node 101 using a suitable network storage protocol, examples of which include, but are not limited to, NVMe over Fabrics (NVMeoF), iSCSI, Fibre Channel (FC), Network File System (NFS), Server Message Block (SMB), and so on. The network interface of compute node 101 allows the software (e.g., the storage protocol or filesystem) running on the processor 104 to communicate with the external applications 103 and external hosts attached to one or more communication networks via the bus 106. In this manner, network storage commands may be issued by the external hosts and processed by the processor 104, which can issue storage commands to the non-volatile memory devices 100 as needed. Data can thus be exchanged between the external hosts and the non-volatile memory devices 100 via interface 140. In this example, any data exchanged is buffered in the memory 102 of the compute node 101.

In some examples, the non-volatile memory devices 100 are located in a datacenter (not shown for brevity). The datacenter may include one or more platforms, each of which supports one or more storage devices (such as but not limited to, the non-volatile memory devices 100). As shown, the non-volatile memory devices 100 can be distributed across data nodes 108a-n. In some implementations, the storage devices within a platform are connected to a Top of Rack (TOR) switch (e.g., switch 109) and can communicate with each other via the TOR switch or another suitable intra-platform communication mechanism. In some implementations, one or more non-volatile memory devices 100 together form a storage node, with the compute node 101 acting as a node controller (e.g., compute node) of the storage nodes (e.g., data nodes 108a-n). An example of a storage node is a Kioxia Kumoscale storage node. One or more storage nodes within a platform are connected to switch 109, each storage node connected to switch 109 via one or more network connections, such as a wired or wireless connection, Ethernet, Fiber Channel or InfiniBand, and can communicate with each other via switch 109 or another suitable intra-platform communication mechanism.

In some implementations, non-volatile memory devices 100 may be network attached storage devices (e.g. Ethernet SSDs) connected to switch 109, with compute node 101 also connected to the switch 109 (e.g., via interface 140) and able to communicate with the non-volatile memory devices 100 via switch 109. In some implementations, at least one router may facilitate communications among the non-volatile memory devices 100 in storage nodes in different platforms, racks, or cabinets via a suitable networking fabric. Examples of the non-volatile memory devices 100 include non-volatile devices such as but are not limited to, Solid State Drive (SSDs), Ethernet attached SSDs, a Non-Volatile Dual In-line Memory Modules (NVDIMMs), a Universal Flash Storage (UFS), a Secure Digital (SD) devices, and so on.

In some examples, the switches 107a, 107b (e.g., PCIe) can include at least one of one or more controllers, one or more physical connectors, one or more data transfer protocols including namespaces, one or more ports, one or more switches, one or more bridges, one or more transport mechanisms, connectivity thereof, and so on. The switches 107a, 107b (e.g., PCIe) can create transaction requests for operation tasks of the processor 104 and send the same to the non-volatile memory devices 100 via the bus 106 according to the addresses of the non-volatile memory devices 100 on the bus 106. In some examples, the switches 107a, 107b (e.g., PCIe) can be implemented on the hardware (e.g., chip) of the processor 104. In some examples, the switches 107a, 107b (e.g., PCIe) and the bus 106 can be collectively referred to as the interface 140 between the host processor 104/memory 102 and the non-volatile memory devices 100 of data nodes 108a-n (collectively referred to herein as "data nodes 108").

Figure 2:
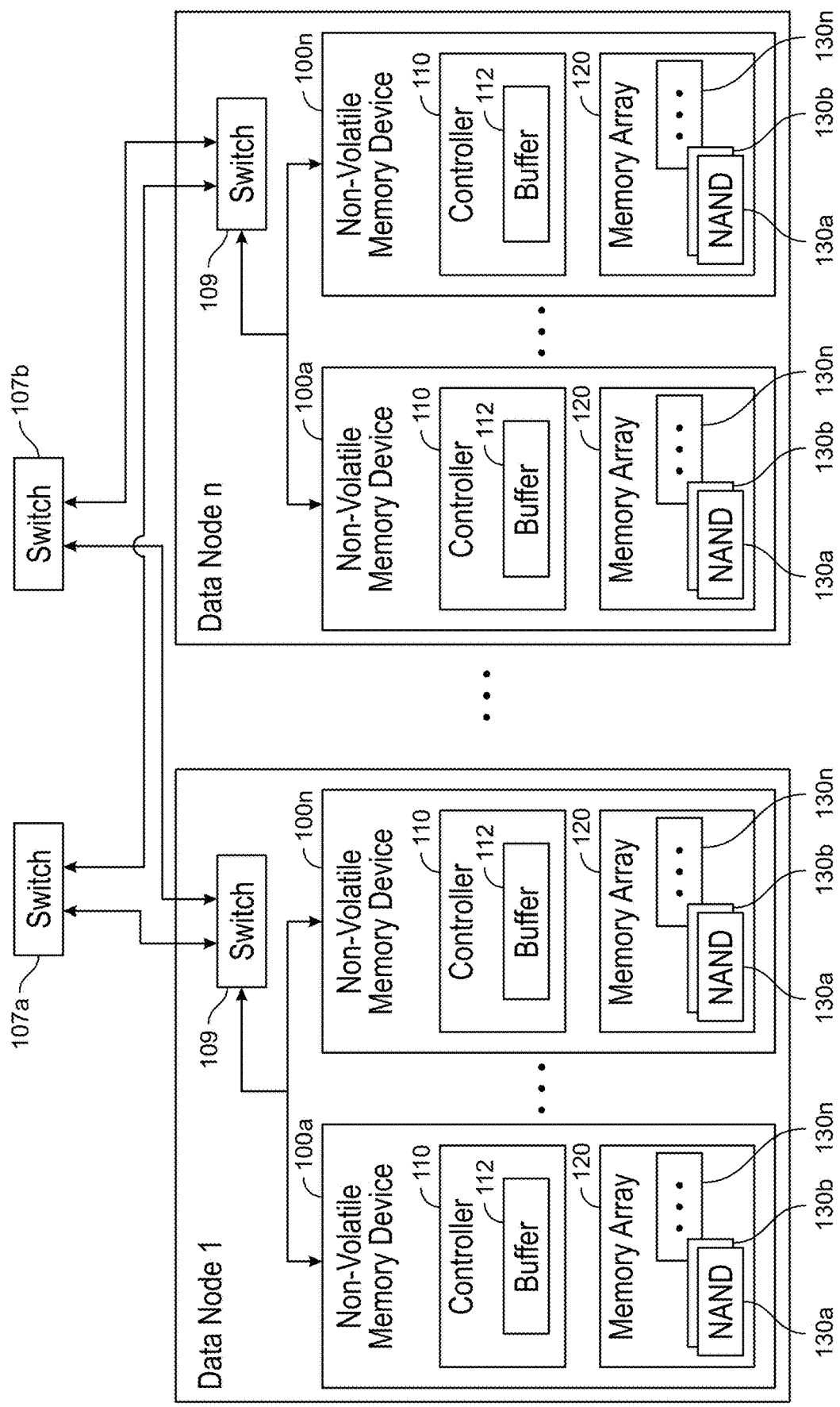
FIG. 2 is a block diagram further illustrating the example system including non-volatile memory devices and the data nodes, according to some implementations.

Referring now to FIG. 2, a block diagram further illustrating the example system including non-volatile memory devices and the data nodes, according to some implementations. The non-volatile memory devices 100 (e.g., non-volatile memory device 100a, . . . , 100n of data node 1, to non-volatile memory device 100a, . . . , 100n of data node n) can include at least a controller 110 and a memory array 120. Other components of the non-volatile memory devices 100 are not shown for brevity. The memory array 120 includes NAND flash memory devices 130a-130n. Each of the NAND flash memory devices 130a-130n includes one or more individual NAND flash dies, which are NVM capable of retaining data without power. Thus, the NAND flash memory devices 130a-130n refer to multiple NAND flash memory devices or dies within the flash memory device 100. Each of the NAND flash memory devices 130a-130n includes one or more dies, each of which has one or more planes. Each plane has multiple blocks, and each block has multiple pages.

While the NAND flash memory devices 130a-130n are shown to be examples of the memory array 120, other examples of non-volatile memory technologies for implementing the memory array 120 include but are not limited to, non-volatile (battery-backed) DRAM, Magnetic Random Access Memory (MRAM), Phase Change Memory (PCM), Ferro-Electric RAM (FeRAM), and so on. The arrangements described herein can be likewise implemented on memory systems using such memory technologies and other suitable memory technologies.

Examples of the controller 110 include but are not limited to, a SSD controller (e.g., a client SSD controller, a datacenter SSD controller, an enterprise SSD controller, and so on), a UFS controller, or an SD controller, and so on. The controller 110 can combine raw data storage in the plurality of NAND flash memory devices 130a-130n such that those NAND flash memory devices 130a-130n function logically as a single unit of storage. The controller 110 can include processors, microcontrollers, a buffer memory (e.g., buffer 112), error correction systems, data encryption systems, Flash Translation Layer (FTL) and flash interface modules. Such functions can be implemented in hardware, software, and firmware or any combination thereof. In some arrangements, the software/firmware of the controller 110 can be stored in the memory array 120 or in any other suitable computer readable storage medium.

The controller 110 can include suitable processing and memory capabilities for executing functions described herein, among other functions. As described, the controller 110 manages various features for the NAND flash memory devices 130a-130n including but not limited to, parity checking, parity computations, I/O handling, reading, writing/programming, erasing, monitoring, logging, error handling, garbage collection, wear leveling, logical to physical address mapping, data protection (encryption/decryption, Cyclic Redundancy Check (CRC)), Error Correction Coding (ECC), data scrambling, and the like. Thus, the controller 110 provides visibility to the NAND flash memory devices 130a-130n.

The buffer 112 can include buffer memory. The buffer memory can be a memory device local to, and operatively coupled to, the controller 110. For instance, the buffer memory can be an on-chip SRAM memory located on the chip of the controller 110. In some implementations, the buffer memory can be implemented using a memory device of the storage device external to the controller 110. For instance, the buffer memory of buffer 112 can be DRAM located on a chip other than the chip of the controller 110. In some implementations, the buffer memory can be implemented using memory devices both internal and external to the controller 110 (e.g., both on and off the chip of the controller 110). For example, the buffer memory can be implemented using both an internal SRAM and an external DRAM, which are transparent/exposed and accessible by other devices via the interface 140, such as the compute node 101 and other non-volatile memory devices 100. In this example, the controller 110 includes an internal processor that uses memory addresses within a single address space and the memory controller, which controls both the internal SRAM and external DRAM, selects whether to place the data on the internal SRAM and an external DRAM based on efficiency. In other words, the internal SRAM and external DRAM are addressed like a single memory. The buffer memory of the buffer 112 can include write buffers, read buffers, Controller Memory Buffers (CMBs), and so on.

As shown, the controller 110 includes a buffer 112, which is sometimes referred to as a drive buffer or a Controller Memory Buffer (CMB). Besides being accessible by the controller 110, the buffer 112 is accessible by other devices via the interface 140, such as the compute node 101 and other non-volatile memory devices 100a, 100b, ... 100n. In that manner, the buffer 112 (e.g., addresses of memory locations within the buffer 112) is exposed across the bus 106, and any device operatively coupled to the bus 106 can issue commands (e.g., read commands, write commands, and so on) using addresses that correspond to memory locations within the buffer 112 in order to read data from those memory locations within the buffer and write data to those memory locations within the buffer 112. In some examples, the buffer 112 is a volatile storage. In some examples, the buffer 112 is a non-volatile persistent storage, which may offer improvements in protection against unexpected power loss of one or more of the non-volatile memory devices 100. Examples of the buffer 112 include but are not limited to, RAM, DRAM, SRAM, MRAM, PCM, and so on. The buffer 112 may refer to multiple buffers each configured to store data of a different type, as described herein.

In some implementations, as shown in FIG. 1, the buffer 112 is a local memory of the controller 110. For instance, the buffer 112 can be an on-chip SRAM memory located on the chip of the controller 110. In some implementations, the buffer 112 can be implemented using a memory device of the storage device external to the controller 110. For instance, the buffer 112 can be DRAM located on a chip other than the chip of the controller 110. In some implementations, the buffer 112 can be implemented using memory devices both internal and external to the controller 110 (e.g., both on and off the chip of the controller 110). For example, the buffer 112 can be implemented using both an internal SRAM and an external DRAM, which are transparent/exposed and accessible by other devices via the interface 140, such as the compute node 101 and other non-volatile memory devices 100. In this example, the controller 110 includes an internal processor uses memory addresses within a single address space and the memory controller, which controls both the internal SRAM and external DRAM, selects whether to place the data on the internal SRAM and an external DRAM based on efficiency. In other words, the internal SRAM and external DRAM are addressed like a single memory.

In one example concerning a write operation, in response to receiving data from the compute node 101 (via the host interface 140), the controller 110 acknowledges the write commands to the compute node 101 after writing the data to a write buffer of buffer 112. In some implementations the write buffer may be implemented in a separate, different memory than the other buffers of buffer 112, or the write buffer may be a defined area or part of a shared memory, where only the CMB part of the memory is accessible by other devices, but not the write buffer. The controller 110 can write the data stored in the write buffer to the memory array 120 (e.g., the NAND flash memory devices 130a-130n). Once writing the data to physical addresses of the memory array 120 is complete, the FTL updates mapping between logical addresses (e.g., Logical Block Address (LBAs)) used by the compute node 101 to associate with the data and the physical addresses used by the controller 110 to identify the physical locations of the data. In another example concerning a read operation, the controller 110 includes a read buffer different from the write buffer 112 and the CMB buffer to store data read from the memory array 120. In some implementations the read buffer may be implemented in a separate, different memory than the other buffers of buffer 112, or the read buffer may be a defined area or part of a shared memory, where only the CMB part of the memory is accessible by other devices, but not the read buffer.

During start up, switch 107a and/or switch 107b can scan the bus 106 for any attached devices (e.g., physically connected or connected via a network such as a network fabric) and obtain the device addresses of the non-volatile memory devices 100 (e.g., routing scans through switch 109 of data nodes), the processor 104, and the memory 102. In some examples, the switches 107a, 107b (e.g., PCIe) scans the bus 106 also for the buffer 112 on the non-volatile memory devices 100. The non-volatile memory devices 100, the buffers 112, and the memory 102 can each be assigned an address space within the logical address space of the processor 104. In some examples, SLM and PMR namespaces can be used for addressing the buffers 112. Accordingly, the processor 104 can perform operations such as read and write using the logical address space. The addresses of the buffers 112 are therefore exposed to the processor 104 and the non-volatile memory devices 100. Other methods of exposing the addresses of the buffers 112, such as memory map (e.g., memory-mapped Input/Output (I/O) space) can be likewise implemented. The memory-mapped I/O space allows any memory coupled to the bus 106 to be mapped to an address recognizable by the processor 104.

Traditionally, to update parity data (or parity) on a parity drive in a RAID 5 or 6 group, 2 read I/O operations, 2 write I/O operations, 4 transfers over the bus 106, and 4 memory buffer transfers are needed. All such operations require CPU cycles, Submission Queue (SQ)/Completion Queue (CQ) entries, Context Switches, and so on, on the processor 104. In addition, the transfer performed between the processor 104 and the memory 102 consume buffer space and bandwidth between the processor 104 and the memory 102. Still further, the communication of data between the processor 104 and the bus 106 consume bandwidth of the bus 106, where the bandwidth of the bus 106 is considered a precious resource because the bus 106 serves as an interface among the different components of the compute node 101. Accordingly, traditional parity update schemes consume considerable resources (e.g., bandwidth, CPU cycles, and buffer space) on the compute node 101.

In a memory device such as a RAID array, configuring one disk to hold the parity bits of corresponding data stored on some number of other disks allows for the data on said other disks to be reconstructed using the parity bits, should one or more such other disk fail. Parity bits (e.g., P parity bit and/or Q parity bit) can be calculated by applying exclusive-or (XOR) operations to two or more data sets. Table 1 demonstrates an example of the possible results of a two-bit input XOR parity operation in which the parity operation output is a 0 if the input bits are different, and is a 1 if the input bits are the same.

TABLE 1

| Exemplary XOR Parity Results | | |
|---|---|---|
| Inputs | | Parity Output |
| 0 | 0 | 1 |
| 0 | 1 | 0 |

TABLE 1-continued

| Exemplary XOR Parity Results | | |
|---|---|---|
| Inputs | | Parity Output |
| 1 | 0 | 0 |
| 1 | 1 | 1 |

Using parity calculations performed as such, one of the inputs can be recovered based on the other input and the parity bit. For example, based on Table 1, if it is known that a first input to the parity calculation is a '0', and that resultant parity bit is a '1', then it can be determined that the second input to the parity calculation was a '0'. In this manner, parity calculations allow for lost inputs to be recovered and provide redundancy.

Figure 3B:
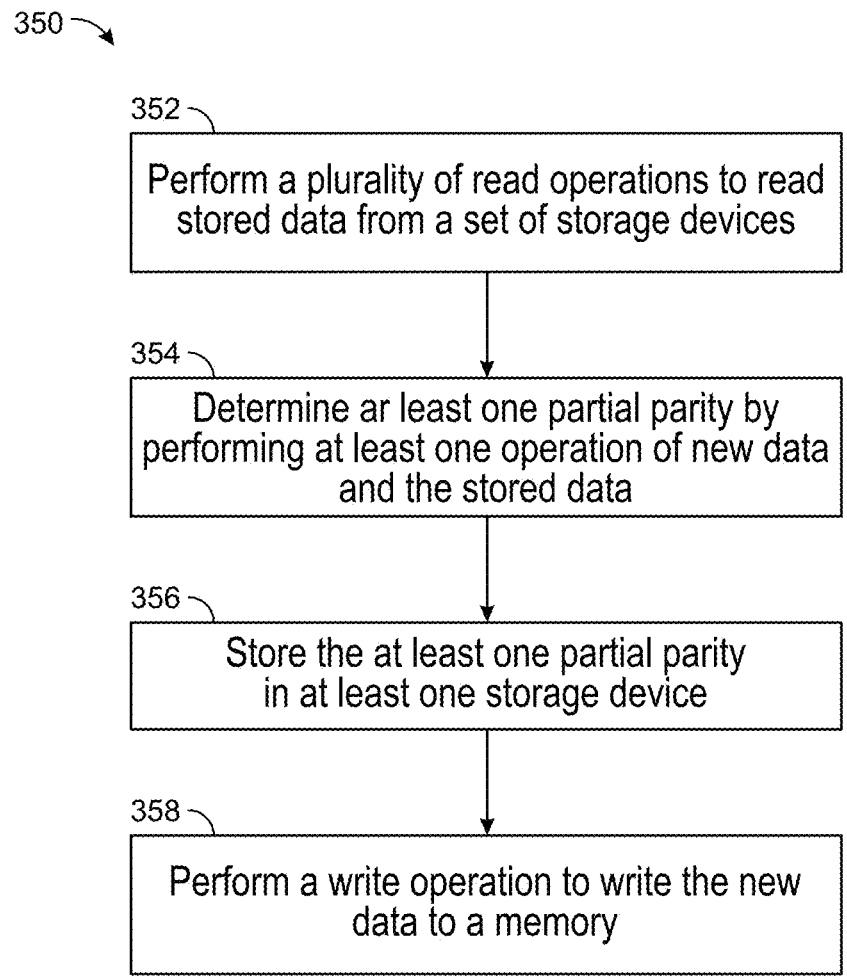
FIG. 3B is a flowchart illustrating an example method for performing one or more parity checks, according to some implementations.
Figure 3C:
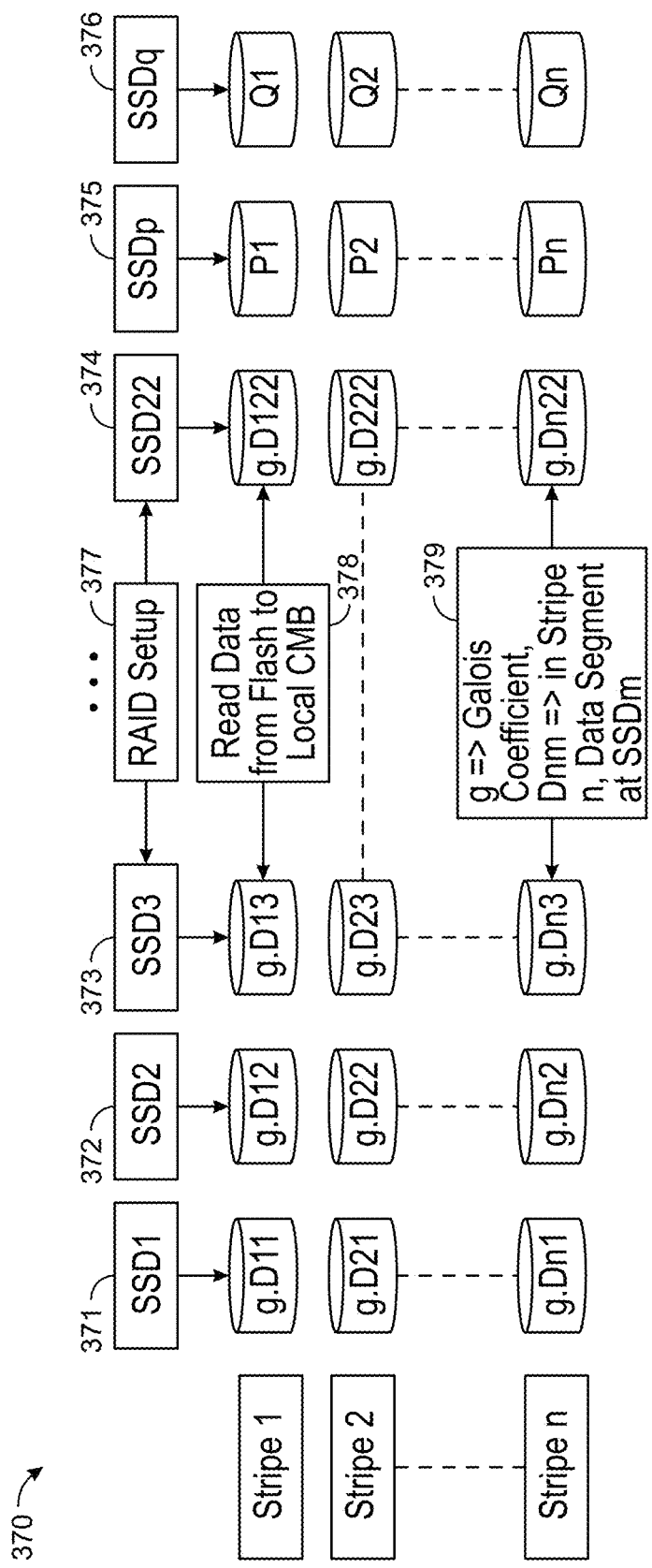
FIG. 3C is a block diagram illustrating an example method for performing one or more parity checks, according to some implementations.

Referring to FIGS. 3A-3C, decoupling of parity calculations may be performed by a controller of a non-volatile memory device, such as storage device 100a. In order to perform parity calculations, servers currently pay a heavy cost in terms of DRAM bandwidth, CPU usage, and performance when performing parity calculations (and other operations, including eraser code computation, data compression and decompression, and encryption). A typical server connected to an array of SSDs, however, may have 8 to 48 connected SSDs (e.g., storage devices). Because a typical server may be connected to 8 to 48 SSDs, the server may have insufficient bandwidth to perform parity calculations, relative to the SSDs.

According to an embodiment of the present disclosure, the controller (e.g., controller 110 of FIG. 2) of each SSD (e.g., non-volatile memory devices 100) can determine parity information for data stored across a plurality of SSDs. Further, the controller of each SSD can also be configured to output the parity information to parity drives of the RAID group, across data nodes. Some or more of the components described in detail in FIGS. 1-2 such as compute node 101, and the particular data nodes 108 and switches 107 are not illustrated in FIGS. 3A-3C for the sake of brevity. However, it should be understood that various operations including storing, reading, writing, retrieving, and exposing described in FIGS. 3A-3C can be facilitated through the use of switch 109 of the various data nodes 108 and switches 107 according to above.

The controller of storage device 100a may be configured to perform XOR operations, and thus serve as an XOR engine. In general, any additional data processing unit (DPU) in communication with the compute node (e.g., computer node 101 of FIGS. 1 and 2) may also perform the parity bit calculations. Regardless of the component of the system to which the parity calculations are offloaded, the RAID array or group will benefit from freed-up bandwidth as the parity bit calculations are offloaded to the XOR engines of storage devices. As described, the method 350 provides improved I/O efficiency, host CPU efficiency, and memory resource efficiency as compared to the conventional data and parity update methods. The method 350 can be performed by storage device 100a or any other non-volatile memory device 100a-n of the various data nodes 108a-n. During disk scrubbing, if discrepancies between recalculated and stored parity are detected (e.g., non-zero XOR output), the new parity can indicate potential data corruption or a parity error, prompting the controller 110 or compute node 101 to either correct the data using the existing parity or to update the erroneous parity.

As will be shown, the XOR result from the CMB (e.g., buffer 112) of the controller (e.g., controller 110) of the storage device 100a is not transferred across the interface 140 into the host 101. Instead, the transient XOR result in the CMB can be directly transferred to a parity drive (e.g., the storage device 100p) to update the parity data corresponding to the updated, new data. The direct transfer can be facilitated using switch 109 and/or switches 107a-b. Furthermore, storage device 100p can be designated to store parity data corresponding to the data stored on the other storage devices 100a-n. In some implementations, another storage device 100q (not shown) can be designated to store parity data corresponding to the data stored on the other storage devices 100a-n. For instance, storage device 100p may store P parity data and storage device 100q may store Q parity data. However, it should be understood that storage device 100p can be configured to store old and new parities of both P and Q parities in NAND of a memory array (e.g., memory array 120).

Referring now to FIG. 3A, a block diagram illustrating an example method for performing one or more parity checks, according to some implementations. The compute node 101 (e.g., host) can submit new data from application 103. The host 101 presents the host buffer (new data) 306 to the controller 110 to be written. In response, at 301a, the controller 110 performs a data transfer to obtain the new data (regular, non-parity data) from the host buffer (new data) 306 through the bus 106 across the interface 140 via the one or more switches, and stores the new data into the device buffer (new data) 308. Generally, the devices buffers 308, 312, 316, and 318 can be CMBs. For instance, the transfer from the host buffer 306 and NANDs 310a, 310b, . . . 310n, and 314 can be facilitated using a copybuf command. That is, the copybuf command or another transfer command may be used by the controller 110 of storage device 100a to pull or access data from the host buffer 306 and/or NAND devices into the device buffers (e.g., CMBs) of controller 110. The write request includes a logical address (e.g., LBA) of the new data.

The controller 110 of the storage device 100a performs a NAND read into a device buffer (old data) 312, at 301b. The NAND read can be of all the non-parity devices of the RAID group or array. The read can be a non-volatile memory (NVM) read command to read or fetch old data stored in the NAND flash memory of the storage devices 100a-n. As shown, the NAND read at 301b can be of local NAND data 310a but also remote NAND data 310b-n. The remote NAND data 310b-n can be from storage devices 100 of the data node (e.g., data node 108a) of storage device 100a and storage devices 100 of other data nodes (e.g., data node 108n). The reads of remote NAND data of the data node of the storage device 100a can be facilitated using switch 109 (e.g., PCIe switch). For example, data transfers across these devices can be managed through the internal networking fabric. In this example, switch 109 may be a fabric bridge or router, facilitating direct, PCIe communications between storage devices within and across different data nodes.

The reads of remote NAND data of another data node can be facilitated using switch 109 and one or more of switches 107a-b. In other words, the controller 110 of data storage 100a can read the old and existing data, corresponding to the logical address in the host's request received at 301a, from the memory arrays 120 (e.g., one or more NAND pages (old data) 310a-n) of storage devices internal to the data node of the storage device 100a and external or remote in other data nodes of the RAID array or group. The controller 110 can then store the old data in the device buffer (old data) 312. The one or more NAND pages (old data) 310a-n can be pages in one or more of the NAND flash memory devices 130a-130n of the storage devices 100a-n of the plurality of data nodes 108a-n. The new data and the old data are data (e.g., regular, non-parity data).

Additionally, the controller 110 of the storage device 100a performs a NAND read into a device buffer (old P&Q parities) 316, at 301c. The NAND read can be of all the parity devices of the RAID group or array (e.g., non-volatile memory device (DP) 100p and/or non-volatile memory device (DQ) 100q). As shown, storage device 100p can be read and the parity information can be stored in device buffer (old P&Q parities) 316. In some implementations, separate NVM commands can be sent to a first storage device storing P parity information (e.g., partial P parity bit) and a second storage device storing Q parity information (e.g., partial Q parity bit). Additionally, the controller 110 may have separate device buffers-device buffer (old P parity) and device buffer (old Q parity).

The read can be an NVM read command to read or fetch old data stored in the NAND flash memory of the storage device 100p (and/or storage device 100q if Q parity data is stored in a separate parity device). As shown, the NAND read at 301c can be of NAND data 314. The parity device (e.g., storage device 100p) may be part of the data node of storage device 100a such that the read can be facilitated using switch 109 of the data node. In some implementations, the parity device may be external to the data node (e.g., on a separate data node of the RAID array) of storage device 100a such that the read can be facilitated using switch 109 and one or more of switches 107a-b. In other words, the controller 110 of data storage 100a can read the parity data from the memory arrays 120 (e.g., one or more NAND pages (old parities) 314) of one or more parity devices internal to the data node of the storage device 100a and external or remote in other data nodes of the RAID array or group. The controller 110 can then store the old parity data in the device buffer (old P&Q parities) 316. The one or more NAND pages 314 can be pages in one or more of the NAND flash memory devices 130a-130n of the storage devices 100a-n of the plurality of data nodes 108a-n. The old parity data can be old P parity information and Q parity information.

At 302, the controller 110 performs one or more XOR operations between data (e.g., new and existing non-parity data, and existing parity data) stored in the CMBs—device buffers 308, 312, and 316—to determine an XOR result, and stores the XOR result in the device buffer (new P&Q parities) 318. That is, the XOR result can occur between three source buffers and one output buffer. In some implementations, the XOR operations can occur on all the data segments of the RAID group—stored as device buffer (old data) 312. The data segments can be a stripe including data D1, D2, . . . . Dn, parity P (partial), and parity Q (partial) of the various storage devices spanning the data nodes of the RAID array. For example, storage device 101a can provide data D1 (existing), storage device 101b can provide data D2 (existing), and so on. Additionally, one or more parity devices (e.g., storage device 100p) can provide parity P data (existing) and parity Q data (existing). In some implementations, parity P data may be provided by a first storage device and parity Q data may be provided by a second storage device.

In some implementations, the XOR operations performed by controller 110 of storage device 100a can be (Equation 1):

Parity Bit $P(\text{New}) = N \oplus P \oplus D1 \oplus D2 \ldots \oplus Dn$

Parity Bit $Q(\text{New}) = N \oplus Q \oplus (g1*D1) \oplus (g2*D2) \ldots \oplus (gn*Dn)$ where $\oplus$ is an XOR operation, N is the new data, P and Q are old parity bits of a stripe, D1-Dn is old data of a stripe, and g1-gn are Galois coefficients. In some implementations, the controller 110 can perform XOR operations on data from stripe 1 to stripe n.

In some implementations, the XOR operations performed by controller 110 of storage device 100a can be (Equation 2):

Parity Bit $PQ(\text{New}) = N \oplus P \oplus D1 \oplus D2 \ldots \oplus Dn \oplus Q \oplus (g1*D1) \oplus (g2*D2) \ldots \oplus (gn*Dn)$ As shown, the parity bit P (partial) and parity bit Q (partial) can be determined separately using separate XOR operations or determined in combination using a single XOR operation. In some implementations, when separate operations occur, the parity bits may be stored into separate parity devices of the RAID array. In some implementations, when one operation occurs, the parity bits may be stored in a single parity device of the RAID array.

In some implementations, the device buffer (new P&Q parities) 318 is a particular implementation of a CMB of the storage device 100a. In other implementations, to conserve memory resources, the CMB (e.g., device buffer (new P&Q parities) 318) can be the same as the device buffers 312 or 316 and is a particular implementation of the buffer 112 of the storage device 100a, such that the XOR results can be written over the content of the device buffers 312 or 316. In this way only two data transfers are performed from the NAND page to the device buffers 312 or 316 and then the XOR result calculated in place in the same location, not requiring any data to be transferred.

The one or more XOR results from the device buffer (new P&Q parities) 318 (e.g., in a CMB) is not transferred across the interface 140 into the compute node 101. Instead, the XOR result in the device buffer (new P&Q parities) 318 can be directly transferred to a parity drive (e.g., the storage device 100p) to update the parity data corresponding to the updated, new data. For instance, the controller 110 can temporarily store the one or more XOR result in the device buffer (new P&Q parities) 318 after determining the XOR result.

At 303a, the controller 110 then updates the old data with the new data by writing the new data from the device buffer (new data) 303a into NAND pages (new data) 320a-n. NAND pages (new data) 320a-n can be a different physical NAND page location than NAND Page (old data) 310a-n given that it is a physical property of NAND memory, and that it is not physically possible to overwrite existing data in a NAND page. Instead, a new NAND physical page can be written and a Logical-to-Physical (L2P) address mapping table updated to indicate the new NAND page corresponding to the logical address used by the compute node 101. The controller 110 of each respective storage device 100a-n can update the L2P addressing mapping table to correspond the physical address of the NAND page (new data) 320a-n with the logical address. In some implementations, each controller 110 of a respective storage device 100a-n can mark the physical address of the NAND pages (old data) 310a-n for garbage collection. In some implementations, 303a can occur before 302.

At 303b, the controller 110 writes the one or more XOR results stored in the device buffer (new P&Q parities) 318 to the non-volatile storage (e.g., the NAND page, NAND (new parities) 322). As noted, the new data and the existing data may correspond to a same logical address. The existing data of NAND (old parities) 314 can be at a first physical address of the storage device 100p. Writing the one or more XOR results to the non-volatile storage includes writing the XOR result to a second physical address of the non-volatile storage (e.g., at the NAND page, NAND (new parities) 322) and updating L2P mapping to correspond the logical address to the second physical address. The writing can be facilitated over switch 109 and/or switches 107a-b. Additionally, when multiple parity bits are determined, the controller 110 may write the multiple XOR results to multiple storage devices (e.g., one storage device storing the new P parity bit, and one storage device storing the new Q parity bit).

Referring now to FIG. 3B, a flowchart illustrating an example method 350 for performing one or more parity checks, according to some implementations. Referring to FIGS. 1, 2, and 3A, method 350 corresponds to FIG. 3A. Method 350 can be performed by the controller of the storage device 100a.

In broad overview of method 350, at block 352, the controller can perform a plurality of read operations to read stored data from a set of storage devices. At block 354, the controller can determine at least one partial parity by performing at least one operation of new data and the stored data. At block 356, the controller can store the at least one partial parity in at least one storage device. At block 358, the controller can perform a write operation to write the new to a memory. Additional, fewer, or different operations may be performed depending on the particular arrangement. In some arrangements blocks can be optionally executed (e.g., blocks depicted as dotted lined) by the one or more processors. Additional, fewer, or different operations may be performed depending on the particular arrangement. In some embodiments, some, or all operations of method 350 may be performed by one or more processors of a controller executing on one or more storage devices. In various embodiments, each operation may be re-ordered, added, removed, or repeated.

At block 352, the controller can perform a plurality of read operations to read stored data from a set of storage devices of a redundant array of independent disk (RAID) volume. The stored data can be existing (old) data and existing parity information (e.g., partial P parity bit, partial Q parity bit). The set of storage devices can be a RAID array or volume. That is, set of storage devices can be multiple non-volatile memory devices 100a-100n part of a RAID (e.g., RAID-5, RAID 6) protection scheme and the stored data can be part of a stripe spanning across the non-volatile memory devices 100a-100n. For example, the first storage device 100a can perform a read operation of a stripe of data from a plurality of memory arrays (e.g., memory array 120). The set of set of storage devices can include one or more parity devices (e.g., P parity storage device, Q parity storage device). For example, a non-volatile memory device can be a P parity device that stores a partial P parity bit for the data of the stripe stored in the non-volatile memory devices 100a-100n-1 (excluding P parity storage device). In another example, a non-volatile memory device can be a Q parity device that stores a partial Q parity bit for the data of the stripe stored in the non-volatile memory devices 100a-100n-2 (excluding P parity storage device and Q parity storage device).

The read operation can span across storage devices and across data nodes. That is, the controller can use a first interface (e.g., switch 109, Top of Rack (TOR) switch, PCIe switch, router, etc.) to perform read operations on the storage devices of the data node having the first storage device. Furthermore, the controller can use the first interface and a second interface (e.g., switches 107a-b and/or interface 140, ethernet switch, PCIe switch, etc.) to perform read operations on storage devices of storage devices of other data nodes.

In some implementations, performing the plurality of read operations is in response to receiving a request from a compute node (e.g., compute node 101 or host) operatively coupled to the first storage device. That is, the compute node can provide a request with new data including device context information of a plurality of non-volatile memory devices. In some examples, the device context information includes addresses of the non-volatile memory devices 100a-100n-1 in the RAID group. The address of a non-volatile memory device can be a CMB address, SLM address, a PMR address, an address descriptor, an identifier, a pointer, or another suitable indicator that identifies the buffer of that non-volatile memory device, as described. In some examples, the request includes the logical address of the data to be updated, including the logical address (e.g., a buffer address) corresponding to each of the buffers. In some examples, the device context information can include permission information of at least one of the plurality of non-volatile memory devices or their buffers.

For instance, in response to receiving the request, the controller can transfer, across an interface, the new data from the compute node to a first local buffer of the controller. In some implementations, the controller can transfer the new data cross two interfaces (e.g., the second interface, such as a PCIe switch, and the first interface, such as TOR switch, described above). The controller can further perform a first read operation of the plurality of read operations to read the stored data from the at least one local non-volatile memory to a second local buffer of the controller. The first local buffer may be a CMB of the controller. In some implementations, the controller can store the new data and the stored data (e.g., existing data and existing parity information) in CMBs of the controller prior to performing the at least one XOR operation.

In some implementations, the controller can perform, across an interface, a second read operation. That is, in response to receiving the request, the controller can perform a second of a plurality of read operations to read the stored data from the at least one remote non-volatile storage of the at least one second storage device to a third local buffer of the controller. That is, the third local buffer may be the same buffer the stored data was already stored in. In some implementations, the interface may be a switch interface facilitating communication between the first storage device and a storage device of the particular data node the first storage device is operatively coupled to. Additionally, the controller may perform a second read operation across multiple interfaces (e.g., switch 109 and/or switches 107a-b).

At block 354, the controller can determine at least one partial parity by performing at least one XOR operation of new data and the stored data. For example, the new data can be received from a compute node. Additionally, the stored data can be stored as first data in at least one local buffer of the first storage device and as second data in at least one second storage device. In some implementations, the stored data can include at least existing data and parity information.

The XOR operation can be a bit-wise calculation of a stripe (old data), the new data, and one or more partial parity bits. In some implementations, a first XOR operation could be performed on the partial P parity bit (with the new data and existing data) and a second XOR operation could be performed on the partial Q parity bit (with the new data, existing data, and Galois coefficient) (see Equation 1). In some implementations, a single XOR operation could be performed on the partial P parity bit and the partial Q parity bit (with the new data, existing data, and Galois coefficient) (see Equation 2).

At block 356, the controller can store the at least one partial parity in at least one third storage device. The at least one partial parity can correspond to a set of data, and the set of data can include the first data and the second data. That is, the at least one partial parity can be a parity of the stripe of data across the RAID volume and the new data. For example, a partial P parity bit can be stored in a parity storage device (e.g., P parity device) using one or more interfaces (e.g., one interface if the parity storage device is encumbered within the data node of the first storage device, or multiple interfaces if the parity storage device is external to the data of the first storage device). In another example, a partial Q parity bit can also be stored in a different parity storage (e.g., Q parity device) device using the one or more interfaces.

At block 358, the controller can perform a write operation to write the new data to the local non-volatile memory. The local non-volatile memory can be a NAND flash memory device 130a-n. Additionally, the controller may perform a write operation to write the new data to other non-volatile memories of the RAID volume. In some implementations, the NAND page (old data) and the NAND page (new data) can be different pages in the NAND flash memory devices 130a-n of each storage device. In some implementations, the first storage device can be one of a plurality of storage devices of a first data node of a plurality of data nodes of the RAID volume. Additionally, the first storage device can be one of the set of storage devices of the plurality of data nodes. The set of storage devices can be a RAID volume (or RAID array or group). Furthermore, the set of storage devices can correspond with a plurality of data segments organized into one or more data stripes of the RAID volume (e.g., D1, D2, D3, . . . . Dn). That is, the data stripe can include a set of data blocks including the set of data distributed across the set of storage devices. In some implementations, each of the set of storage devices is a solid-state drive (SSD) in communication with the compute node (or host) via the interface.

Referring now to FIG. 3C, a block diagram illustrating an example method 370 for performing one or more parity checks, according to some implementations. As shown, a plurality of SSDs (e.g., SSD1 371, SSD2 372, SSD3 373 . . . . SSD22 374, SSDp 375, SSDq 376) can store data segments or stripes of data (e.g., stripe 1 to stripe n). As shown, storage device SSDp 375 and SSDq 376 may be parity devices configured to store, manage, and update parities. For example, SSDp 375 can manage partial P parity bit and SSDq 376 can manage partial Q parity bit. The various SSDs can communicate over various interfaces. In some implementations, SSD1-SSD8 may be a first data node operatively coupled via a PCIe switch. Additionally, SSD9-SSD16 may be a second data node operatively coupled via a PCIe switch. Furthermore, SSD17-SSD22 and SSDp and SSDq may be a third data node operatively coupled via a PCIe switch. The various data nodes can be operatively coupled over another switch external to the data node (e.g., switches 107*a-b*).

At step 377, the compute node 101 can perform a RAID setup. RAID setup may include configuring the redundancy level, assigning SSDs to specific RAID groups, defining striping widths, and setting up parity rotation schedules. Configuration parameters can be determined based on system requirements for performance and data protection. RAID levels can be selected to balance write performance, read performance, and parity overhead. The RAID setup process can include assigning physical drives to logical arrays and specifying the size of data stripes across the disks. At step 378, a controller may read data from flash to local CMBs. For instance, the controller may read data from various NANDs 130*a-n* of the various storage devices 100*a-n*. The local CMBs can be buffers used to perform the XOR operations (e.g., to determine partial parities). At step 379, the controller can apply XOR operations using Galois coefficients (g) to compute parity across different data segments (Dnm) within stripe (n), where each segment (Dnm) can be stored located on a specific SSD (SSDm). This calculation can include using the Galois field arithmetic to manage the parity computation, in RAID configurations like RAID 6 that can require two sets of parity (e.g., partial P parity bit and partial Q parity bit). The XOR operations with Galois coefficients can facilitate the generation of parity information (or data), which can be used to reconstruct data in the event of disk failures.

Referring to FIGS. 4A-4D, decoupling of parity calculations may be performed by a plurality of controllers of non-volatile memory devices 100. FIGS. 4A-4D can include similar features and functionalities as described above with references to FIGS. 3A-3C. However, instead of one storage device performing the XOR operations, the XOR operations can be distributed across the data nodes of the RAID volume such that intermediate parities can be calculated.

In order to perform parity calculations, servers currently pay a heavy cost in terms of DRAM bandwidth, CPU usage, and performance when performing parity calculations (and other operations, including eraser code computation, data compression and decompression, and encryption). A typical server connected to an array of SSDs, however, may have 8 to 48 connected SSDs (e.g., storage devices). Because a typical server may be connected to 8 to 48 SSDs, the server may have insufficient bandwidth to perform parity calculations, relative to the SSDs.

According to an embodiment of the present disclosure, the controller (e.g., controller 110 of FIG. 2) of each SSD (e.g., non-volatile memory devices 100) can determine parity information (e.g., intermediate parity information, and partial parity information) for data stored across a plurality of SSDs. Further, the controller of each SSD can also be configured to output the parity information to parity drives of the RAID group, across data nodes. Some or more of the components described in detail in FIGS. 1-2 such as compute node 101, and the particular data nodes 108 and switches 107 are not illustrated in FIGS. 4A-4D for the sake of brevity. However, it should be understood that various operations including storing, reading, writing, retrieving, and exposing described in FIGS. 4A-4D can be facilitated through the use of switch 109 of the various data nodes 108 and switches 107 according to above.

The controller 110 of a storage device may be configured to perform XOR operations, and thus serve as an XOR engine. In general, any additional data processing unit (DPU) in communication with the compute node (e.g., computer node 101 of FIGS. 1 and 2) may also perform the parity bit calculations. Regardless of the component of the system to which the parity calculations are offloaded, the RAID array or group will benefit from freed-up bandwidth as the parity bit calculations are offloaded to the XOR engines of storage devices. As described, the method 480 provides improved I/O efficiency, host CPU efficiency, and memory resource efficiency as compared to the conventional data and parity update methods. The method 480 can be performed by a storage device 100 or any other non-volatile memory device 100*a-n* of the various data nodes 108*a-n*.

As will be shown, the XOR result from the CMB (e.g., buffer 112) of the controller 110 of the storage device 100 is not transferred across the interface 140 into the host 101. Instead, intermediate XOR results in the CMB can be exposed to other storage devices of other data nodes 108*a-n*. Furthermore, the final XOR results (e.g., XORing the intermediate XOR results) in the CMB can be directly transferred to a parity drive (e.g., the storage device 100*p*) to update the parity data. The direct transfer can be facilitated using switch 109 and/or switches 107*a-b*. Furthermore, storage device 100*p* can be designated to store parity data corresponding to the data stored on the other storage devices 100*a-n*. In some implementations, another storage device 100*q* (not shown) can be designated to store parity data corresponding to the data stored on the other storage devices 100*a-n*. For instance, storage device 100*p* may store P parity data and storage device 100*q* may store Q parity data. However, it should be understood that storage device 100*p* can be configured to store old and new parities of both P and Q parities in NAND of a memory array (e.g., memory array 120).

Figure 4A:
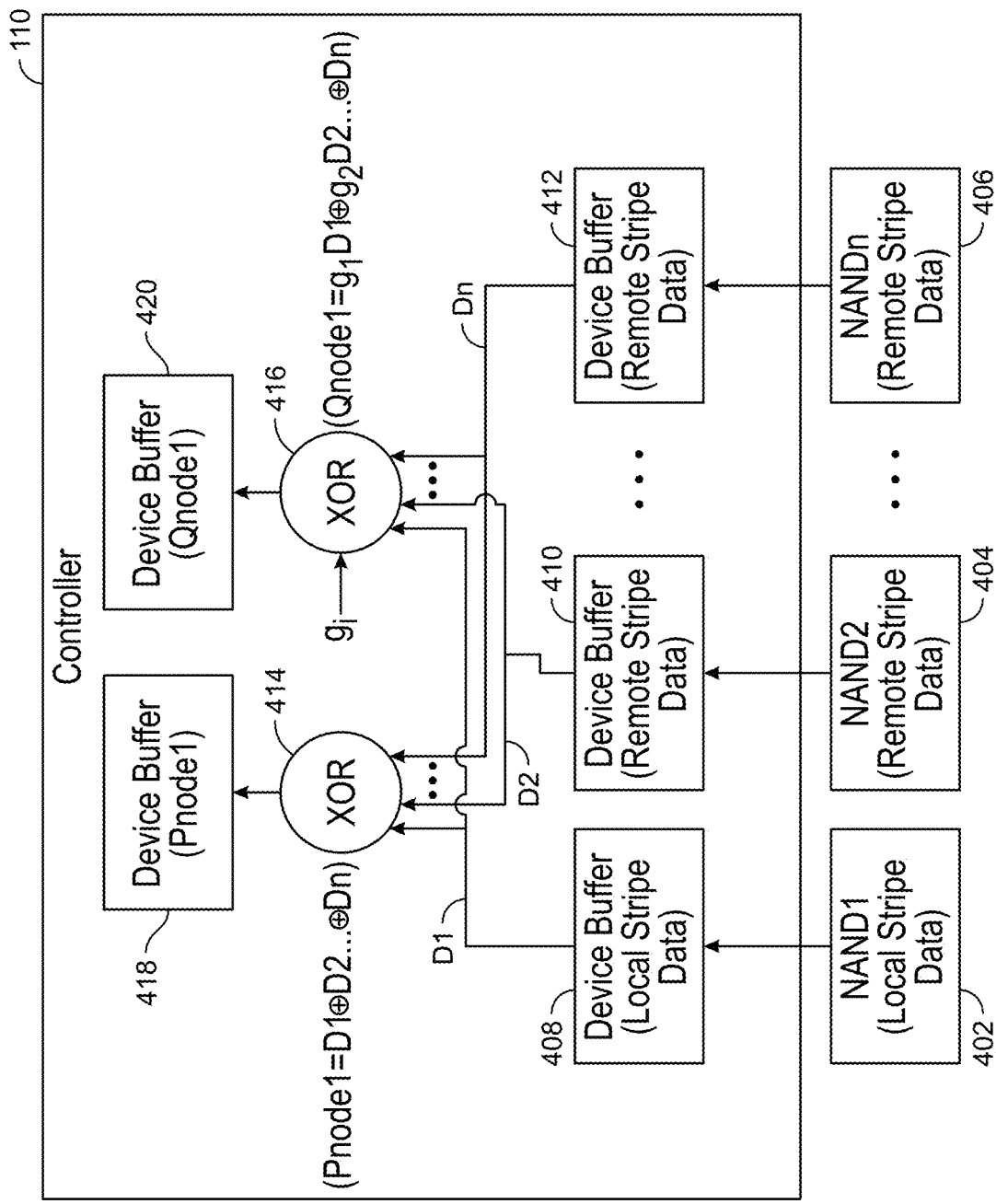
FIG. 4A is a block diagram illustrating an example method for performing one or more parity checks on a data node using a controller of a storage device, according to some implementations.

Referring now to FIG. 4A, a block diagram illustrating an example method for performing one or more parity checks on a data node using a controller 110 of a storage device, according to some implementations. Disk scrubbing operations including performing a parity check can be initiated by the compute node 101 and/or controller 110 periodically or during suitable conditions. Generally, the devices buffers 408, 410, 412, 418, and 420 can be CMBs. For instance, the transfer from NAND1 402, NAND2 404, . . . . NANDn 406 can be facilitated using a copybuf command. That is, the copybuf command or another transfer command may be used by the controller 110 of the storage device 100 to pull or access data from the NAND devices into the device buffers (e.g., CMBs) of controller 110. The command can include a logical address (e.g., LBA) of the new data.

The controller 110 of the storage device performs a NAND read into a device buffer (local stripe data) 408. The NAND read can be of the storage device of the controller 110. For instance, NAND1 (local stripe data) 402 can be stored in a memory array of the non-volatile memory device of controller 110. Additionally, the controller 110 can interface with other storage devices of connected to a specific switch 109 (e.g., PCIe switch). That is, the other storage devices of the specific switch 109 can form a data node. For instance, the data node can include storage devices D1-D8. In some implementations, the controller 110 of the storage device performs NAND reads into one or more device buffers (remote stripe data) 410 and 412. In some implementations, the local stripe data and remote stripe data may be read into a single device buffer.

For instance, NAND2 (remote stripe data) 404 may be stored in a memory array of a non-volatile memory device of the data node. In another instance, NANDn (remote stripe data) 406 may be stored in a memory array of a non-volatile memory device of the data node. In these instances, the controller 110 can interface with and retrieve or read the remote stripe data using switch 109 of the data node. As shown, the controller 110 can perform a NAND read of storage devices (parity and non-parity) of the data node of a RAID group or array (or RAID volume). That is, the NAND read can be of a portion of a data segment of the RAID array. For instance, the portion of the data segment may be SSD1-SSD8 of data node 1. In another instance, the portion of the data segment may be SSD17-SSD22 including SSDp and SSDq (both parity devices). In some implementations, the remote stripe data may corresponding parity data of the stripe. It should be appreciated a controller of a storage device of each data node can perform a NAND read into one or more device buffers.

As shown, the read can be a non-volatile memory (NVM) read command to read or fetch data stored in the NAND flash memory of the storage devices 100a-n of a particular data node. As shown, the NAND read at 408-412 can be of local NAND data but also remote NAND data of a data node (interconnected via switch 109). The remote NAND data can be from storage devices 100 of the data node (e.g., data node 108a) of storage device 100. The reads of remote NAND data of the data node of the storage device 100a can be facilitated using switch 109 (e.g., PCIe switch). For example, data transfers across these devices can be managed through the internal networking fabric. In this example, switch 109 may be a fabric bridge or router, facilitating direct, PCIe communications between storage devices within and across different data nodes.

The read can be an NVM read command to read or fetch data stored in the NAND flash memory of the one or more storage devices 100. In some implementations, the controller 110 of data storage 100 can read the parity data from the memory arrays 120 (e.g., one or more NAND pages) of one or more parity devices internal to the data node of the storage device 100 of the RAID array or group. The controller 110 can then store the parity data in a device buffer. The one or more NAND pages can be pages in one or more of the NAND flash memory devices 130a-130n of the storage devices 100a-n of a partial data node (e.g., data node 108a).

At 414 and 416, the controller 110 performs one or more XOR operations between data (e.g., non-parity data and/or parity data—if parity devices are storage devices of the data node of controller 110) stored in the CMBs—device buffers 408, 410, 412—to determine one or more XOR results, and store the XOR results in device buffer (Pnode1) 418 and device buffer (Qnode1) 420. That is, the XOR results can occur between three source buffers and two output buffers. In some implementations, the XOR operations can occur on a portion of a stripe of the data segments of the RAID group—stored as device buffer (local stripe data) 408 and device buffers (remote stripe data) 410-412. The data segments can be a stripe including data D1, D2, . . . . Dn, parity P (partial), and parity Q (partial) of the various storage devices spanning a specific data of the RAID array. For instance, a data segment can include data of D1, D2, . . . . Dn, parity P (partial), and parity Q (partial). In this instance, a first controller of a first storage device of a first data node may perform XOR operations on data D1-D8 to determine first intermediate parity data, Pnode1 and Qnode1. In another instance, a second controller of a second storage device of a second data node may perform XOR operations on data D9-D16 to determine intermediate parity data, Pnode2 and Qnode2. In yet another instance, a third controller of a third storage device of a third data node may perform XOR operations on data D17-D22 including parity device P and parity device Q to determine intermediate parity data, Pnode3 and Qnode3. In some implementations, a single XOR operation can be performed such that intermediate parity data can reflect both the P and Q parity. For instance, the local and remote stripe data of the device buffers of controller 110 can be used as input into an XOR operation to determine an intermediate partial parity, where both P and Q parity computations can be performed in the single XOR operation (e.g., PQnode1, PQnode2 . . . . PQnoden).

Additionally, one or more parity devices can provide parity P data (existing) and parity Q data (existing) to controller 110. In some implementations, parity P data may be used to perform a first XOR operation on controller 110 (e.g., first intermediate partial parity) when parity device P is a storage device of the data node of controller 110. However, when two XOR operations are performed (e.g., P and Q), the XOR operation, such as XOR operation 414 may XOR the partial P parity, whereas XOR operation 416 will only XOR a partial Q parity if the parity device Q is encumbered in the data node. In some implementations, parity Q data may be used to perform a second XOR operation on a different controller when parity device P is a storage device of the another data node. However, when two XOR operations are performed (e.g., P and Q), the XOR operation, such as XOR operation 416 may XOR the partial Q parity, whereas XOR operation 414 will only XOR a partial P parity if the parity device P is encumbered in the data node.

In some implementations, XOR operation 414 performed by controller 110 of a storage device of a data node can be (Equation 3):

Intermediate Partial Parity Bit $P(\text{Pnode1}) = D1 \oplus D2 \ldots \oplus Dn$ where $\oplus$ is an XOR operation, D1-Dn is data of a stripe stored on a storage device (e.g., SSD). In some implementations, when parity device P is a storage device in the data node of controller 110, the XOR operation 414 performed by controller 110 of a storage device of a data node can be (Equation 4):

Intermediate Partial Parity Bit $P(\text{Pnode1}) = D1 \oplus D2 \ldots \oplus Dn \oplus P$ where P an old partial P parity bit of the stripe.

In some implementations, XOR operation 416 performed by controller 110 of a storage device of a data node can be (Equation 5):

Intermediate Partial Parity Bit $Q(\text{Qnode1}) = (g1*D1) \oplus (g2*D2) \ldots \oplus (gn*Dn)$ where $\oplus$ is an XOR operation, D1-Dn is data of a stripe stored on a storage device (e.g., SSD), and g1-gn are Galois coefficients. In some implementations, when parity device Q is a storage device in the data node of controller 110, the XOR operation 416 performed by controller 110 of a storage device of a data node can be (Equation 6):

Intermediate Partial Parity Bit $Q(\text{Qnode1}) = (g1*D1) \oplus (g2*D2) \ldots \oplus (gn*Dn) \oplus Q$ where Q is an old partial Q parity bit of the stripe.

In some implementations, the XOR operation (combining XOR operation 414 and 416) performed by controller 110 of a storage device of a data node can be (Equation 7):

Intermediate Partial Parity Bit $PQ(\text{PQnode1}) = D1 \oplus D2 \ldots \oplus Dn \oplus (g1*D1) \oplus (g2*D2) \ldots \oplus (gn*Dn)$ where P and/or Q may be included in Equation 7 when parity device P or parity device Q is a storage device of the data node of controller 110.

In some implementations, the controller 110 can perform XOR operations on data from stripe 1 to stripe n. As shown, the intermediate partial parity (e.g., parity bit P and parity bit Q) can be determined separately using separate XOR operations (Equations 3-6) or determined in combination using a single XOR operation (Equation 7). In some implementations, when separate operations occur, the intermediate partial parity data may be stored into separate CMBs—device buffer (Pnode1) 418 and device buffer (Qnode1) 420. In some implementations, when one operation occurs, the intermediate partial parity data may be stored in a single CMB of controller 110.

In some implementations, device buffer (Pnode1) 418 and device buffer (Qnode1) 420 can be a particular implementation of a CMB of controller 110. In other implementations, to conserve memory resources, the CMB can be the same as the device buffers 408-412 and is a particular implementation of the buffer 112 of the storage device, such that the XOR results can be written over the content of the device buffers 408-412. The one or more XOR results from device buffer (Pnode1) 418 and device buffer (Qnode1) 420 (e.g., in a CMB) is not transferred across the interface 140 into the compute node 101. Instead, the XOR results can be exposed to another controller to perform final parity computation or other XOR results (e.g., other intermediate partial parity computations) can be retrieved by controller 110 to perform final parity computation. That is, intermediate partial parity data can be directly transferred or exposed to other storage devices of the RAID array or group. Additionally, final parity data in the device buffers can be directly transferred to a parity drive to update the parity data. For instance, the controller 110 can temporarily store the one or more XOR result in device buffer (Pnode1) 418 and device buffer (Qnode1) 420 after determining the XOR results.

Figure 4B:
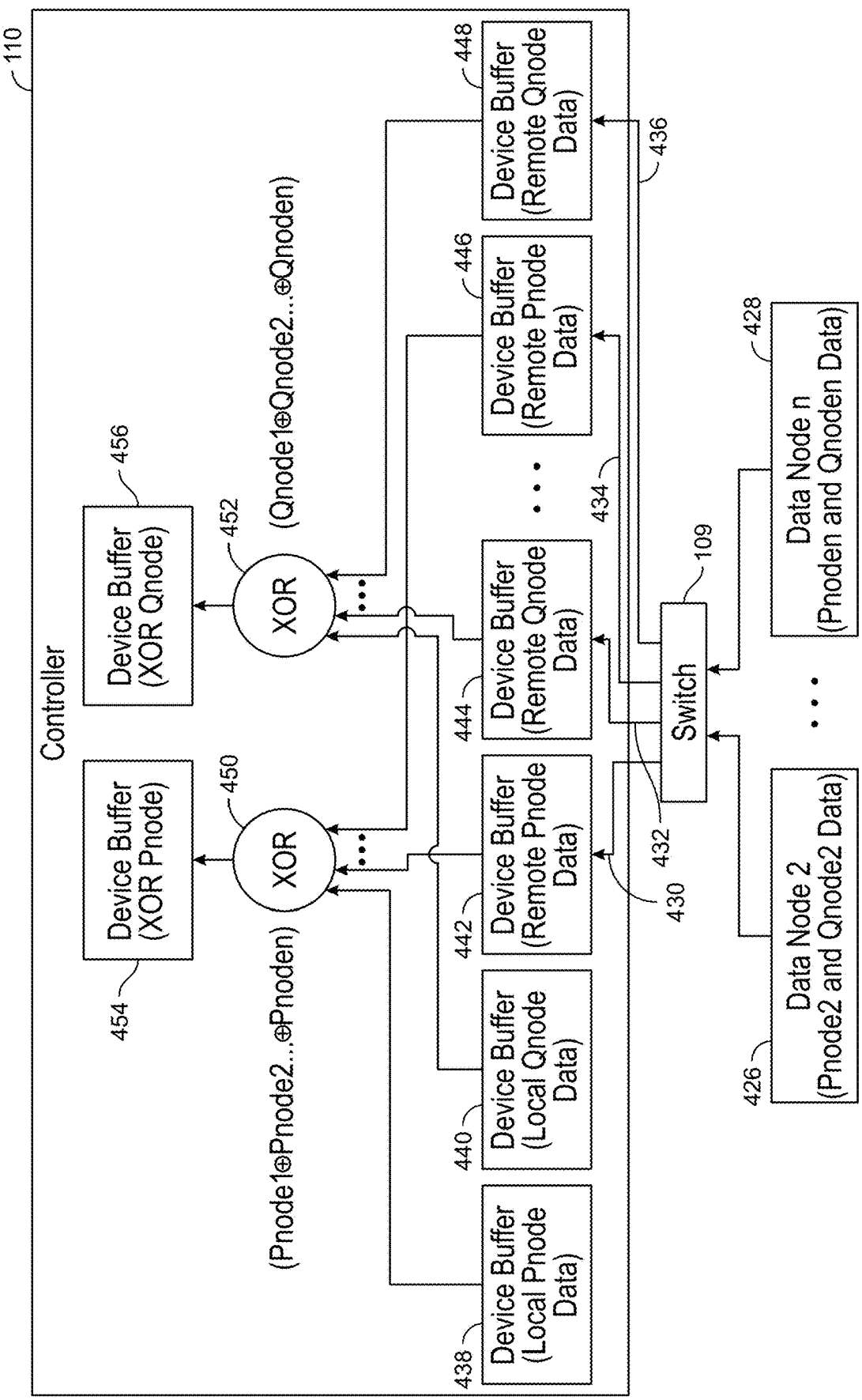
FIG. 4B is a block diagram illustrating an example method for performing one or more parity checks across data nodes using a controller of a storage device, according to some implementations.

Referring now to FIG. 4B, a block diagram illustrating an example method for performing one or more parity checks across data nodes using a controller of a storage device, according to some implementations. Generally, the devices buffers 438-448 can be CMBs. For instance, the transfer from CMBs of the data nodes can be facilitated using a copybuf command. That is, the copybuf command or another transfer command may be used by the controller 110 of the storage device 100 to pull or access data from the buffers of other storage devices into the device buffers (e.g., CMBs) of controller 110. The read request can include a logical address (e.g., LBA) of the intermediate partial parity data.

As described in detail with reference to FIG. 4A, one or more controllers of each data node of the plurality of data nodes can perform XOR operations to determine one or more intermediate partial parity bits. Now in FIG. 4B, controller 110 of a storage device of a particular node can perform the final partial parity operations. A parity check can be initiated by one or more controllers of various data nodes. That is, one or more controllers of the non-volatile memory devices 100 perform XOR operations to compute intermediate partial parity bits. As shown, this process includes reading data from NAND flash memory and applying XOR operations to generate intermediate partial P and Q parity bits. Additionally, the intermediate parity results can be exposed to controllers at other data nodes through the use of switch 109. Furthermore, controller 110 can retrieve these intermediate parity results (e.g., locally from a CMB or externally from a CMB of other controllers) to determine final partial parity bits. For instance, additional XOR operations on these intermediate results can be performed by controller 110, using switch 109 and/or switches 107a-b for data transfer of the intermediate partial parity bits. This process can update the parity data and stores it in dedicated parity devices within the RAID array, as described.

Generally, the controllers of the storage devices can include device buffers (e.g., device buffers 408-412, 418-420 of FIG. 4A and device buffers 438-448 of FIG. 4B), which is sometimes referred to as a drive buffer or a CMB. Besides being accessible by the controller 110, the devices buffers can be accessible by other devices via switch 109 and/or switches 107a-b, such as other storage devices 100a, 100b, . . . 100n. In that manner, the device buffers (e.g., addresses of memory locations within the buffer) can be exposed across the switch 109 and/or switches 107a-b, and any device operatively coupled to the switch 109 and/or switches 107a-b can issue commands (e.g., read commands, write commands, store commands, retrieve commands, and so on) using addresses that correspond to memory locations within the device buffer (e.g., of controllers of storage devices on data nodes) in order to read data from those memory locations within the buffer and write data to locations within a buffer of controller 110. For instance, Pnode2 and Qnode2 data (e.g., intermediate parity bit data) can be exposed by a controller of a storage device of data node 2 such that controller 110 (e.g., of data node 1) can read the exposed intermediate parity bit data via one or more interfaces (e.g., switch 109 and/or switches 107a-b) into device buffers 442-444. In another instance, Pnoden and Qnoden data (e.g., intermediate parity bit data) can be exposed by a controller of a storage device of data node n such that controller 110 (e.g., of data node 1) can read the exposed intermediate parity bit data via one or more interfaces (e.g., switch 109 and/or switches 107a-b) into device buffers 446-448.

As described above, a first controller (e.g., controller 110) of a first storage device of a first data node of the RAID volume can perform a first intermediate partial P and Q parity computation, which can stored in device buffer (local Pnode data) 438 and device buffer (local Qnode data) 440. Furthermore, a second controller of a second storage device of a second data node of the RAID volume can perform a second intermediate partial P and Q parity computation, which can stored in device buffer (remote Pnode data) 442 and device buffer (local Pnode data) 444. As shown, it should be appreciated each data node can include at least one controller that performs intermediate parity computations, and at least one controller of the plurality of data storages of the RAID volume can perform the partial parity bit computations (e.g., partial P parity bit, and partial Q parity bit).

The controller 110 of the storage device of FIG. 4B can perform buffer read into device buffers 442-448. That is, device buffers 438-440 may already included stored intermediate partial parity data determined by controller 110. However, in some implementations, a different controllers that did not perform any of the intermediate partial parity computations may be used. The buffer read can be of all buffers storing the intermediate parity data. That is, one or more storage devices of the nodes may be designed as intermediate parity calculation devices. The read can be a buffer read command (e.g., direct memory access (DMA) command) to read or fetch intermediate parity data stored in the exposed buffers of one or more storage devices. For instance, the buffer read command allows for accessing data directly from the device buffers where intermediate parity data is stored. That is, this facilitates data access across different controllers and data nodes without additional processing. The buffer read command can include a logical address (LBA) that specifies the location of the data with the buffers. For instance, when intermediate parity bits are calculated and stored, the corresponding logical block addresses (LBAs) can be updated or flagged in a way that indicates to controller 110 when the intermediate calculations were performed. In another instance, controller 110 can determine the LBA of a buffer of a controller of another node that performed the XOR operations by accessing synchronized mapping tables shared among controllers. In yet another instance, controller 110 can determine the LBA of a buffer of a controller of another node that performed the XOR operations by decoding updates communicated through the RAID volume's internal network protocol The remote data stored in remote device buffers can be from storage devices 100 of other data nodes (e.g., data node 108*b-n*, such as data node 2 and data node n). The reads of remote buffer data of a data node of the controller 110 can be facilitated using switch 109 (e.g., PCIe switch). For example, data transfers across these devices can be managed through the internal networking fabric. In this example, switch 109 may be a fabric bridge or router, facilitating direct, PCIe communications between storage devices within and across different data nodes. Additionally, the reads of remote buffer data of another data node can be facilitated using switch 109 and one or more of switches 107*a-b*. In other words, the controller 110 of the data storage can read the intermediate partial parity data, corresponding to the logical address in the device buffers. The controller 110 can then store data node 2 (Pnode2 and Qnode2 data) 426 and data node 2 (Pnode2 and Qnode2 data) 428 in the device buffer 442-448. In some implementations, the controller 110 may route various intermediate partial parity data to different devices buffers. For instance at 430, the controller 110 can store Pnode2 data of data node 2 into device buffer (remote Pnode data) 442. In another instance at 432, the controller 110 can store Qnode2 data of data node 2 into device buffer (remote Qnode data) 444. In yet another instance at 434, the controller 110 can store Pnoden data of data node n into device buffer (remote Pnode data) 446. In yet another instance at 436, the controller 110 can store Qnoden data of data node n into device buffer (remote Qnode data) 448. Nonetheless, it should be appreciated that controller 110 may also store all the Pnode and Qnode data in a single device buffer or in a designed Pode device buffer and Qnode device buffer (e.g., two device buffers). As shown, the controller 110 of the storage device can performs buffer reads into device buffers 442-448 from the external data nodes. The buffer read can be of all the computed intermediate partial parity bits stored in CMBs of the RAID group or array (e.g., non-volatile memory devices 100).

At 450 and 452, the controller 110 performs one or more XOR operations between data (e.g., intermediate partial parity information) stored in the CMBs—device buffers 438-448—to determine one or more XOR results, and stores the XOR results in device buffer (XOR Pnode) 454 and device buffer (XOR Qnode) 456. That is, the XOR results can occur between six source buffers and two output buffers. In some implementations, the XOR operations can occur be of a stripe of the data segments of the RAID group. The data segments—represented in the intermediate paritial parity bits—can be a stripe including data D1, D2, . . . Dn, parity P (partial), and parity Q (partial) of the various storage devices spanning a specific data of the RAID array. For instance, a XOR Pnode can be a partial P parity check of a data segment including data of D1, D2, . . . Dn, and parity P (partial). For instance, a XOR Qnode can be a partial Q parity check of a data segment including data of D1, D2, . . . Dn, and parity Q (partial).

In these instances, a first controller of a first storage device of a first data node may perform XOR operations on data D1-D8 to determine first intermediate parity data, Pnode1 and Qnode1. In another instance, a second controller of a second storage device of a second data node may perform XOR operations on data D9-D16 to determine intermediate parity data, Pnode2 and Qnode2. In yet another instance, a third controller of a third storage device of a third data node may perform XOR operations on data D17-D22 including parity device P and parity device Q to determine intermediate parity data, Pnode3 and Qnode3. In XOR operations 450 and 452, the intermediate parity data can be XORed. In some implementations, a single XOR operation can be performed such that the final (or aggregate) parity data can reflect both the P and Q parity. For instance, the local and remote Pnode data of the device buffers 438-448 of controller 110 can be used as input into an XOR operation to determine a final partial parity, where both P and Q parity computations can be performed in the single XOR operation (e.g., PQnode).

In some implementations, XOR operation 450 performed by controller 110 of a storage device of a data node can be (Equation 8):

Partial Parity Bit $P(\text{XOR Pnode}) = \text{Pnode1} \oplus \text{Pnode2} \ldots \oplus \text{Pnoden}$ where $\oplus$ is an XOR operation, Pnode1-n is intermediate partial parity data of data nodes (e.g., having a plurality of storage devices and computed by a controller of one or more of the plurality of storage devices). The intermediate partial parity data can also include old or existing parity information of parity storage devices (e.g., parity device P and parity device Q).

In some implementations, XOR operation 452 performed by controller 110 of a storage device of a data node can be (Equation 9):

Partial Parity Bit $Q(\text{XOR Qnode}) = \text{Qnode14} \oplus \text{Qnode2} \ldots \oplus \text{Qnoden}$ where $\oplus$ is an XOR operation, and Qnode1-n were calculated using data of NAND devices and Galois coefficients. In some implementations, the partial parity bits may be XORed at the final partial parity bit operation such that partial parity bit P are XORed with the Pnode1-n (in Equation 8) and partial parity bit Q are XORed with the Qnode1-n (in Equation 9).

In some implementations, the XOR operation (combining XOR operation 450 and 452) performed by controller 110 of a storage device of a data node can be (Equation 10):

Partial Parity Bit $PQ(\text{PQnode}) = \text{Pnode1} \oplus \text{Pode2} \ldots \oplus \text{Pnoden} \oplus \text{Qnode1} \oplus \text{Qnode2} \ldots \oplus \text{Qnoden}$ In some implementations, the controller 110 can perform XOR operations on data from stripe 1 to stripe n. As shown, the partial parity bits (e.g., parity bit P and parity bit Q) can be determined separately using separate XOR operations (Equations 8-9) or determined in combination using a single XOR operation (Equation 10). In some implementations, when separate operations occur, the partial parity data may be stored into separate CMBs-device buffer (XOR Pnode) 454 and device buffer (Qnode) 456. In some implementations, when one operation occurs, the partial parity data may be stored in a single CMB of controller 110.

In some implementations, device buffer (XOR Pnode) 454 and device buffer (Qnode) 456 can be a particular implementation of a CMB of controller 110. In other implementations, to conserve memory resources, the CMB can be the same as the device buffers 438-448 and is a particular implementation of the buffer 112 of the storage device, such that the XOR results can be written over the content of the device buffers 438-448. The one or more XOR results from device buffer (XOR Pnode) 454 and device buffer (Qnode) 456 (e.g., in a CMB) is not transferred across the interface 140 into the compute node 101. Instead, the XOR results can be stored in parity storage devices. That is, partial parity data can be directly transferred or exposed to other storage devices of the RAID array or group (e.g., non-volatile memory device (DP) 100$p$ and non-volatile memory device (DQ) 100$q$). That is, final parity data in the device buffers 454 and 456 can be directly transferred to a parity drive to update the parity data. For instance, the controller 110 can temporarily store the one or more XOR result in buffer (XOR Pnode) 454 and device buffer (Qnode) 456 after determining the XOR results.

After storing the XOR results in device buffers 454 and 456, the controller 110 can write the one or more XOR results stored in device buffer (XOR Pnode) 454 and device buffer (XOR Qnode) 456 to a non-volatile storage (e.g., the NAND page) of a parity device-non-volatile memory device (DP) 100$p$ (referred to as "device buffer P") and volatile memory device (DQ) 100$q$ (referred to as "device buffer Q") of FIG. 1). As noted, the new data and the existing data may correspond to a same logical address. The existing data of NAND (old partial parity bit) can be at a first physical address of the device buffer P or device buffer Q. Writing the one or more XOR results to the non-volatile storage includes writing the XOR result to a second physical address of the non-volatile storage (e.g., at the NAND page) and updating L2P mapping to correspond the logical address to the second physical address. The writing can be facilitated over switch 109 and/or switches 107$a$-$b$. Additionally, when multiple parity bits are determined, the controller 110 may write the multiple XOR results to multiple storage devices (e.g., one storage device storing the new P parity bit (partial), and one storage device storing the new Q parity bit (partial)).

Figure 4C:
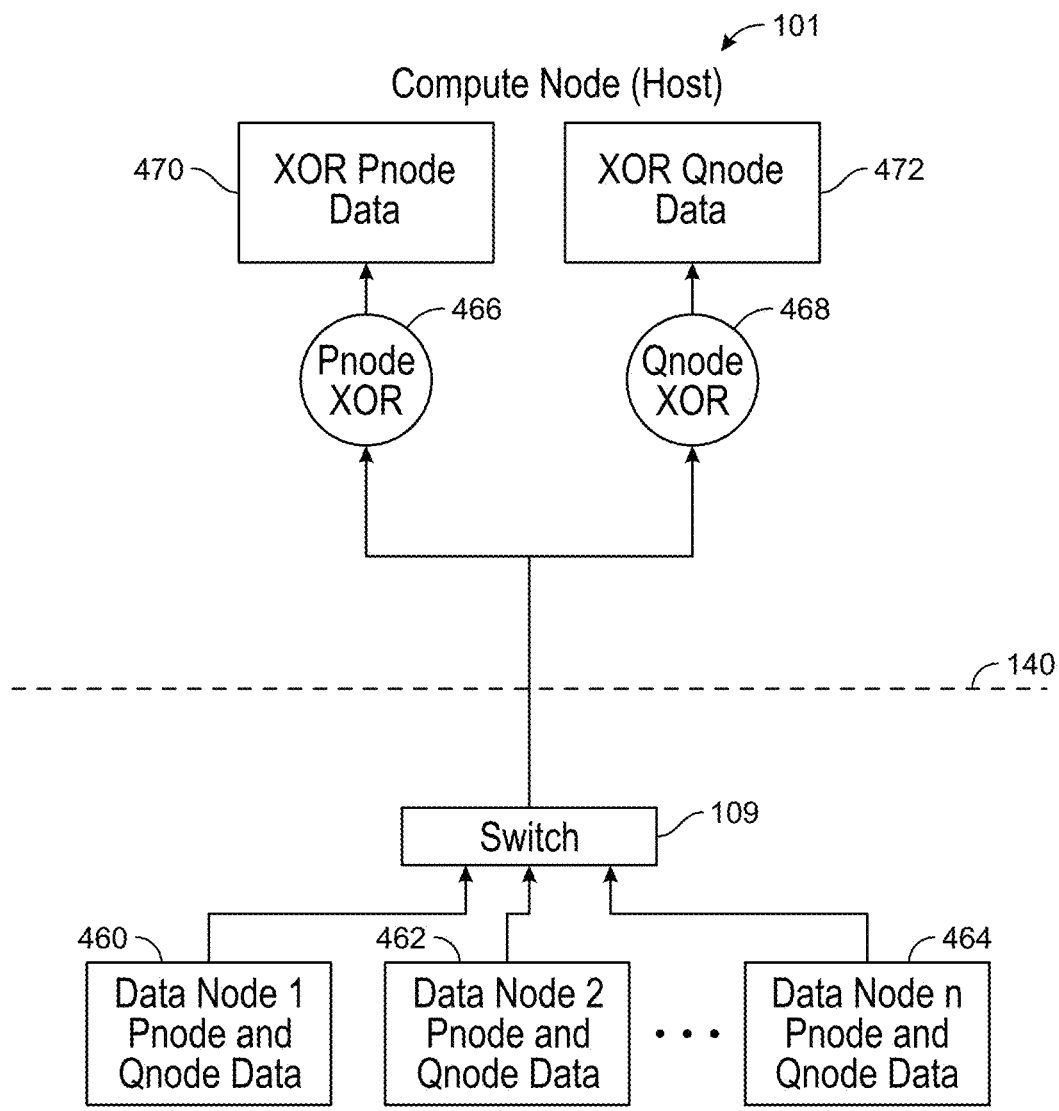
FIG. 4C is a block diagram illustrating an example method for performing one or more parity checks across data nodes using a compute node, according to some implementations.

Referring now to FIG. 4C, a block diagram illustrating an example method for performing one or more parity checks across data nodes using a compute node, according to some implementations. In some implementations, the intermediate partial parity data may be provided to the compute node 101 to perform XOR operations. For example, a controller of a storage device of data node 1 may expose or transmit data node 1 Pnode and Qnode data 460 to the compute node 101 via switch 109 and/or over interface 140 (e.g., using switches 107$a$-$b$). In another example, a controller of a storage device of data node 2 may expose or transmit data node 2 Pnode and Qnode data 462 to the compute node 101 via switch 109 and/or over interface 140 (e.g., using switches 107$a$-$b$). In yet another example, a controller of a storage device of data node 2 may expose or transmit data node 3 Pnode and Qnode data 464 to the compute node 101 via switch 109 and/or over interface 140 (e.g., using switches 107$a$-$b$). As shown, compute node 101 may perform XOR operation on the intermediate partial parity data. For instance, a Pnode XOR operation 466 (e.g., XOR) may be performed on the intermediate partial P parity data and then saved in a buffer or memory of the compute node 101 as XOR Pnode data 470. In another instance, a Qnode XOR operation 468 (e.g., XOR) may be performed on the intermediate partial P parity data and then saved in a buffer or memory of the compute node 101 as XOR Qnode data 470. In some implementations, the compute node 101 may interface with one or more parity drives (or parity storage devices) of the RAID volume to write the new computed partial P and Q parity bits.

Figure 4D:
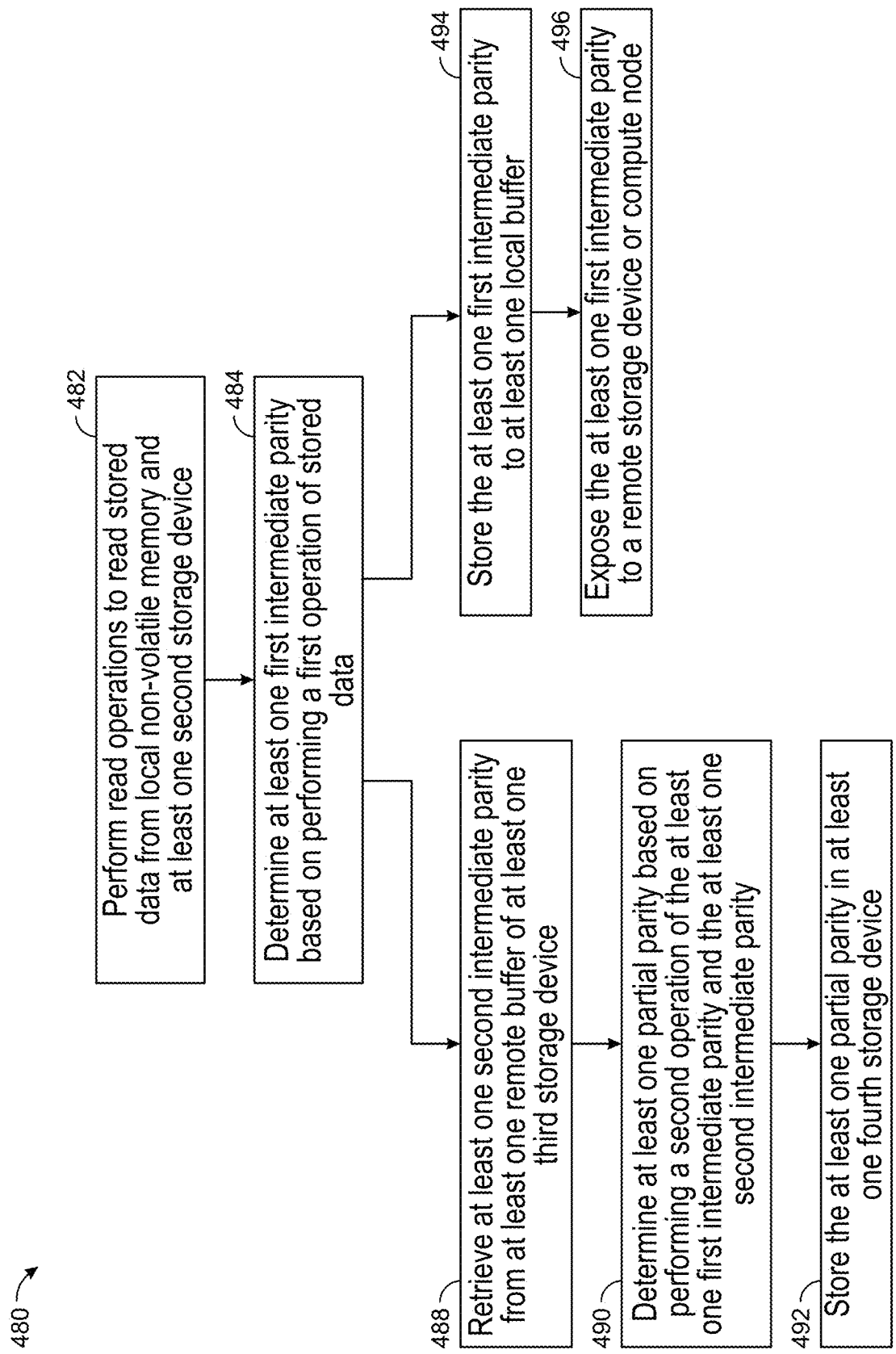
FIG. 4D is a flowchart illustrating an example method for performing one or more parity checks, according to some implementations.

Referring now to FIG. 4D, a flowchart illustrating an example method for performing one or more parity checks, according to some implementations. Referring to FIGS. 1, 2, and 4A-4B, method 480 corresponds to FIG. 4A-4B. Method 480 can be performed by the controller of the storage device 100$a$.

In broad overview of method 480, at block 482, the controller can perform read operations to read stored data from local non-volatile memory and at least one second storage device. At block 484, the controller can determine at least one first intermediate parity based on performing a first operation of stored data. At block 488, the controller can retrieve at least one second intermediate parity from at least one remote buffer of at least one third storage device. At 490, the controller can determine at least one partial parity based on performing a second operation of the at least one first intermediate parity and the at least one second intermediate parity. At block 492, the controller can store the at least one partial parity in at least one fourth storage device. At block 494 (after block 484), the controller can store the at least one first intermediate parity to at least one local buffer. At block 496, the controller can expose the at least one first intermediate parity to a remote storage device or compute node. Additional, fewer, or different operations may be performed depending on the particular arrangement. In some arrangements blocks can be optionally executed (e.g., blocks depicted as dotted lined) by the one or more processors. Additional, fewer, or different operations may be performed depending on the particular arrangement. In some embodiments, some, or all operations of method 480 may be performed by one or more processors of a controller executing on one or more storage devices. In various embodiments, each operation may be re-ordered, added, removed, or repeated.

At block 482, the controller can perform a plurality of read operations to read first data from the local non-volatile memory and at least one second storage device. In some implementations, the first storage device can be one of a plurality of storage devices of a first data node of a plurality of data nodes of a redundant array of independent disk (RAID) volume. That is, the first storage device can be one of a set of storage devices of the plurality of data nodes. Furthermore, the set of storage devices can correspond with a plurality of data segments organized into a data stripe of the RAID volume. In some implementations, the data stripe can include a set of data blocks including the set of data distributed across the set of storage devices. For instance, each of the set of storage devices can be a solid-state drive (SSD) in communication with a compute node 101 via an interface (e.g., interface 140 using switch 109). In some implementations, in response to performing the plurality of read operations, the controller can perform a write operation to write the stored data to one or more controller memory buffers (CMBs) of the controller. In some implementations, the controller can include one or more CMBs. Furthermore, the local non-volatile memory can correspond with the controller including a NAND memory device. Additionally, the first storage device can correspond with a portion of the data segment (e.g., can be D1 of D1-Dn of the data segment, including partial P parity bit and partial Q parity bit).

At block 484, the controller can determine at least one first intermediate parity based on performing at least one first XOR operation of the first data. That is, the at least one first intermediate parity can be stored in at least one local buffer of the first storage device. In some implementations, the at least one first intermediate parity can include an intermediate partial P parity bit and an intermediate partial Q parity bit of the plurality of storage devices of the first data node. In some implementations, the at least one first intermediate parity can include an intermediate partial PQ parity bit of the plurality of storage devices of the first data node. In some implementations, in response to determining the at least one first intermediate parity, the controller store the at least one first intermediate parity in the one or more CMBs of the controller (e.g., to expose to other controls of the RAID volume or for further processing to determine partial parity bits using intermediate parities determined by other nodes).

At block 488, the controller can retrieve at least one second intermediate parity of second data from at least one remote buffer of at least one third storage device. For instance, the at least one second intermediate parity can be stored in the at least one remote buffer of at least one third storage device after being determined by the at least one third storage device. In some implementations, the at least one second intermediate parity is retrieved from the at least one remote buffer of the at least one third storage device exposed to the first storage device for retrieval. That is, the third storage device can include a controller which performed XOR operations on a different data node (from the first storage device) to determine one or more intermediate partial parity bits. In some implementations, the at least one third storage device can correspond with a second data node of the plurality of data nodes. For instance, the first storage device and the at least one third storage device operatively coupled via the interface (e.g., PCIe switch (switch 109) and/or switches 107a-b).

At block 490, the controller can determine at least one partial parity based on performing at least one second XOR operation of the at least one first intermediate parity and the at least one second intermediate parity. That is, the XOR operation can be of the various intermediate parities calculated in the RAID array or group. In some implementations, the at least one of partial parity can include a partial P parity bit and a partial Q parity bit of the plurality of data nodes. In some implementations, the at least one of partial parity can include a partial PQ parity bit of the plurality of data nodes.

At block 492, the controller can store the at least one partial parity in at least one fourth storage device. For instance, the fourth storage device may be a dedicated parity storage or drive configured to manage, update, and store parity bits. In some implementations, a parity storage may store partial P parity bit and another parity storage may store partial Q parity bit. Furthermore, at least one partial parity can correspond to a set of data (e.g., stripes of a data segment), and the set of data can include the first data and the second data. That is, the parity computations can be parities of an entire stripe of data distributed across storage devices and data nodes of a RAID volume. In some implementations, the controller can perform a write operation to write the at least one partial parity to at least one remote non-volatile storage of the at least one fourth storage device (e.g., P parity storage device and/or Q parity storage device).

At block 494, the controller can store at least one intermediate parity to at least one local buffer. That is, the first storage device can be one of a plurality of storage devices of a first data node of a plurality of data nodes of the RAID volume. For instance, the first storage device can be one subset of a set of storage devices of the plurality of data nodes. In some implementations, the set of storage devices can correspond with a plurality of data segments organized into a data stripe of the RAID volume, and the data stripe can include a set of data blocks comprising the set of data distributed across the set of storage devices. For instance, each of the set of storage devices may be a solid-state drive (SSD) in communication with the compute node via an interface (e.g., switch 109 and/or switches 107a-b).

At block 496, the controller can expose the at least one intermediate parity of the at least one local buffer to at least third storage device or a compute node, wherein the at least one intermediate parity correspond to one of a plurality of intermediate parities used to determine at least one partial parity of a redundant array of independent disk (RAID) volume. In some implementations, the at least one intermediate parity can include an intermediate partial P parity bit and an intermediate partial Q parity bit of the plurality of storage devices of the first data node. In some implementations, the at least one intermediate parity can include an intermediate partial PQ parity bit of the plurality of storage devices of the first data node.

In some implementations, the at least one third storage device can correspond to a second data node and the first storage device and the at least one third storage device can be operatively coupled via the interface (e.g., switch 109 and/or switches 107a-b). In some implementations, in response to performing the plurality of read operations, the controller can perform a write operation to write the stored data to one or more controller memory buffers (CMBs) of the controller. Furthermore, in response to determining the at least one intermediate parity, the controller can store the at least one intermediate parity to the one or more CMBs of the controller. That is, the intermediate parity can be exposed to other storage devices (e.g., to perform operations in blocks 488-492).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical drive storage, magnetic drive storage or other magnetic storages, or any other medium that may be used to store desired program code in the form of instructions or data structures and that may be accessed by a computer. Drive and disc, as used herein, includes compact disc (CD), laser disc, optical disc, digital versatile disc (DVD), floppy drive, and Blu-ray disc where drives usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A first storage device, comprising:
   a local non-volatile memory; and
   a controller configured to:
   perform a plurality of read operations to read first data from the local non-volatile memory and at least one second storage device;
   determine at least one first intermediate parity based on performing at least one first XOR operation of the first data, the at least one first intermediate parity being stored in at least one local buffer of the first storage device;
   retrieve at least one second intermediate parity of second data from at least one remote buffer of at least one third storage device, the at least one second intermediate parity being stored in the at least one remote buffer of at least one third storage device after being determined by the at least one third storage device;
   determine at least one partial parity based on performing at least one second XOR operation of the at least one first intermediate parity and the at least one second intermediate parity; and
   store the at least one partial parity in at least one fourth storage device, the at least one partial parity corresponds to a set of data, and the set of data comprises the first data and the second data.

2. The first storage device of claim 1, wherein:
   the at least one second intermediate parity is retrieved from the at least one remote buffer of the at least one third storage device exposed to the first storage device for retrieval.

3. The first storage device of claim 1, wherein:
the first storage device is one of a plurality of storage devices of a first data node of a plurality of data nodes of a redundant array of independent disk (RAID) volume;
the first storage device is one of a set of storage devices of the plurality of data nodes;
the set of storage devices corresponding with a plurality of data segments organized into a data stripe of the RAID volume;
the data stripe comprises a set of data blocks comprising the set of data distributed across the set of storage devices; and
each of the set of storage devices is a solid-state drive (SSD) in communication with a compute node via an interface.

4. The first storage device of claim 3, wherein:
the at least one first intermediate parity comprises an intermediate partial P parity bit and an intermediate partial Q parity bit of the plurality of storage devices of the first data node; and
the at least one of partial parity comprises a partial P parity bit and a partial Q parity bit of the plurality of data nodes.

5. The first storage device of claim 3, wherein:
the at least one first intermediate parity comprises an intermediate partial PQ parity bit of the plurality of storage devices of the first data node; and
the at least one of partial parity comprises a partial PQ parity bit of the plurality of data nodes.

6. The first storage device of claim 3, wherein:
the at least one third storage device corresponds to a second data node of the plurality of data nodes; and
the first storage device and the at least one third storage device operatively coupled via the interface.

7. The first storage device of claim 1, wherein the controller is further configured to:
in response to performing the plurality of read operations, perform a write operation to write the stored data to one or more controller memory buffers (CMBs) of the controller; and
in response to determining the at least one first intermediate parity, store the at least one first intermediate parity in the one or more CMBs of the controller.

8. The first storage device of claim 7, wherein:
the at least one local buffer is the one or more CMBs of the controller; and
the at least one at least one remote buffer is one or more remote CMBs of a remote controller of the at least one third storage device.

9. The first storage device of claim 7, wherein:
the controller comprise the one or more CMBs;
the local non-volatile memory corresponding with the controller comprises a NAND memory device; and
the first storage device corresponding with a portion of a data segment.

10. The first storage device of claim 1, wherein storing the at least one partial parity in the at least one fourth storage device comprises:
performing a write operation to write the at least one partial parity to at least one remote non-volatile storage of the at least one fourth storage device.

11. A method, comprising:
performing a plurality of read operations to read first data from a local non-volatile memory and at least one second storage device;
determining at least one first intermediate parity based on performing at least one first XOR operation of the first data, the at least one first intermediate parity being stored in at least one local buffer of the first storage device;
retrieving at least one second intermediate parity of second data from at least one remote buffer of at least one third storage device, the at least one second intermediate parity being stored in the at least one remote buffer of at least one third storage device after being determined by the at least one third storage device;
determining at least one partial parity based on performing at least one second XOR operation of the at least one first intermediate parity and the at least one second intermediate parity; and
storing the at least one partial parity in at least one fourth storage device, the at least one partial parity corresponds to a set of data, and the set of data comprises the first data and the second data.

12. The method of claim 11, wherein:
the at least one second intermediate parity is retrieved from the at least one remote buffer of the at least one third storage device exposed to the first storage device for retrieval.

13. The method of claim 11, wherein:
the first storage device is one of a plurality of storage devices of a first data node of a plurality of data nodes of a redundant array of independent disk (RAID) volume;
the first storage device is one of a set of storage devices of the plurality of data nodes;
the set of storage devices corresponding with a plurality of data segments organized into a data stripe of the RAID volume;
the data stripe comprises a set of data blocks comprising the set of data distributed across the set of storage devices; and
each of the set of storage devices is a solid-state drive (SSD) in communication with a compute node via an interface.

14. The method of claim 13, wherein:
the at least one first intermediate parity comprises an intermediate partial P parity bit and an intermediate partial Q parity bit of the plurality of storage devices of the first data node; and
the at least one of partial parity comprises a partial P parity bit and a partial Q parity bit of the plurality of data nodes.

15. The method of claim 13, wherein:
the at least one first intermediate parity comprises an intermediate partial PQ parity bit of the plurality of storage devices of the first data node; and
the at least one of partial parity comprises a partial PQ parity bit of the plurality of data nodes.

16. The method of claim 13, wherein:
the at least one third storage device corresponds to a second data node of the plurality of data nodes; and
the first storage device and the at least one third storage device operatively coupled via the interface.

17. The method of claim 11, further comprising:
in response to performing the plurality of read operations, performing a write operation to write the stored data to one or more controller memory buffers (CMBs); and
in response to determining the at least one first intermediate parity, storing the at least one first intermediate parity in the one or more CMBs.

18. The method of claim 17, wherein:
the at least one local buffer is the one or more CMBs; and
the at least one at least one remote buffer is one or more remote CMBs of a remote controller of the at least one third storage device.

19. The method of claim 11, wherein storing the at least one partial parity in the at least one fourth storage device comprises:
performing a write operation to write the at least one partial parity to at least one remote non-volatile storage of the at least one fourth storage device.

20. At least one non-transitory processor-readable medium comprising processor-readable instructions, such that, when executed by a processor of a first storage device, causes the processor to:
perform a plurality of read operations to read first data from a local non-volatile memory and at least one second storage device;
determine at least one first intermediate parity based on performing at least one first XOR operation of the first data, the at least one first intermediate parity being stored in at least one local buffer of the first storage device;
retrieve at least one second intermediate parity of second data from at least one remote buffer of at least one third storage device, the at least one second intermediate parity being stored in the at least one remote buffer of at least one third storage device after being determined by the at least one third storage device;
determine at least one partial parity based on performing at least one second XOR operation of the at least one first intermediate parity and the at least one second intermediate parity; and
store the at least one partial parity in at least one fourth storage device, the at least one partial parity corresponds to a set of data, and the set of data comprises the first data and the second data.

* * * * *